(12) United States Patent
Pan et al.

(10) Patent No.: US 10,868,657 B2
(45) Date of Patent: Dec. 15, 2020

(54) WIRELESS NETWORK CONFIGURED TO PROVIDE MIXED SERVICES

(71) Applicant: IDAC Holdings, Inc., Wilmington, DE (US)

(72) Inventors: Kyle Jung-Lin Pan, Saint James, NY (US); Arnab Roy, Phoenixville, PA (US); Mohamed Abou El Seoud, San Francisco, CA (US); Fengjun Xi, San Diego, CA (US); Kevin T. Wanuga, Souderton, PA (US); William E. Lawton, Pottstown, PA (US); Janet A. Stern-Berkowitz, Little Neck, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 36 days.

(21) Appl. No.: 16/315,534

(22) PCT Filed: Jul. 5, 2017

(86) PCT No.: PCT/US2017/040729
§ 371 (c)(1),
(2) Date: Jan. 4, 2019

(87) PCT Pub. No.: WO2018/009548
PCT Pub. Date: Jan. 11, 2018

(65) Prior Publication Data
US 2019/0215133 A1    Jul. 11, 2019

Related U.S. Application Data

(60) Provisional application No. 62/358,430, filed on Jul. 5, 2016.

(51) Int. Cl.
*H04L 5/00* (2006.01)
*H04L 27/34* (2006.01)
(Continued)

(52) U.S. Cl.
CPC .......... *H04L 5/0064* (2013.01); *H04L 1/0003* (2013.01); *H04L 1/0026* (2013.01);
(Continued)

(58) Field of Classification Search
CPC . H04L 5/0064; H04L 27/3488; H04L 1/0003; H04L 1/0026; H04W 72/042
See application file for complete search history.

(56) References Cited

U.S. PATENT DOCUMENTS

2008/0159430 A1* 7/2008 Steer .................... H04L 27/3483
                                                            375/267
2013/0170535 A1* 7/2013 Atungsiri ............. H04L 27/2649
                                                            375/229
(Continued)

OTHER PUBLICATIONS $3^{rd}$ Generation Partnership Project (3GPP), R1-1705882, "Puncturing Indication and Supplementary Transmission for Preemption-Based Multiplexing of URLLC and eMBB in DL", Sequans Communications, 3GPP TSG RAN WG1 Meeting #88bis, Spokane, USA, Apr. 3-7, 2017, 6 pages.
(Continued)

*Primary Examiner* — Mohammad S Anwar
(74) *Attorney, Agent, or Firm* — Condo Roccia Koptiw LLP

(57) ABSTRACT

Systems, procedures, and instrumentalities are disclosed providing mixed data services such as mixed URLLC and eMBB services. In one example implementation, hierarchical modulation is dynamically configured and/or applied to provide the mixed services. The dynamic configuration and application of hierarchical modulation may be based on the respective priorities of the services and a condition of the concerned wireless network. The provision of the mixed services may utilize polar coding techniques. Control information may be mixed with data associated with the services.

17 Claims, 17 Drawing Sheets

(51) Int. Cl.
  *H04L 1/00* (2006.01)
  *H04W 72/04* (2009.01)
  *H04L 27/18* (2006.01)

(52) U.S. Cl.
  CPC .......... *H04L 1/0061* (2013.01); *H04L 5/0082* (2013.01); *H04L 27/3488* (2013.01); *H04W 72/042* (2013.01); *H04W 72/0446* (2013.01); *H04L 5/0007* (2013.01); *H04L 5/0091* (2013.01); *H04L 27/183* (2013.01)

(56) References Cited

U.S. PATENT DOCUMENTS

| | | |
|---|---|---|
| 2015/0139120 A1 | 5/2015 | Elarabawy et al. |
| 2015/0326360 A1 | 11/2015 | Malladi et al. |
| 2016/0013897 A1* | 1/2016 | Sun ................. H04L 1/0058 370/312 |
| 2017/0064673 A1 | 3/2017 | Li |

OTHER PUBLICATIONS

3rd Generation Partnership Project (3GPP), TR 38.913 V0.3.0, "Technical Specification Group Radio Access Network, Study on Scenarios and Requirements for Next Generation Access Technologies, (Release 14)", Mar. 2016, 30 pages.

Hattachi et al., "NGMN 5G White Paper", Version 1.0, NGMN Alliance, Feb., 2015, 125 Pages.

ITU-R, "IMT Vision-Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

Zhang et al., "Design and Realization of the Hierarchical Broadcast System Based on GNA Radio", 4th IEEE International Conference on Broadband Network and Multimedia Technology, Oct. 28-30, 2011.

* cited by examiner

WIRELESS NETWORK CONFIGURED TO PROVIDE MIXED SERVICES

CROSS-REFERENCE TO RELATED APPLICATIONS

This application is the National Stage entry under 35 U.S.C. § 371 of Patent Cooperation Treaty Application PCT/US2017/040729, filed Jul. 5, 2017, which claims the benefit of Provisional U.S. Patent Application No. 62/358,430, filed Jul. 5, 2016, the disclosure of which is incorporated herein by reference in its entirety.

BACKGROUND

Mobile communications continue to evolve. A fifth generation may be referred to as 5G while previous generations of mobile communication may include fourth generation (4G) systems, long term evolution (LTE) systems, third generation (3G) systems, etc. A 5G system may be configured to transmit and receive different types of communications including, for example, Enhanced Mobile Broadband (eMBB) communications, Massive Machine Type Communications (mMTC), Ultra Reliable and Low Latency Communications (URLLC), and/or the like.

SUMMARY

Systems, procedures, and instrumentalities are described herein for providing mixed services on a wireless network. The mixed services may include, for example, an eMBB service configured with a first priority and a URLLC service configured with a second priority. The URLLC priority may be higher than the eMBB priority. A wireless transmit receive unit (WTRU) may receive, from the wireless network, resource allocation for transmitting at least an eMBB bit-stream. The WTRU may determine that a URLLC bit-stream is awaiting transmission, for example after receiving the resource allocation from the wireless network. The WTRU may transmit the eMBB and URLLC bit-streams using at least a subset of the resource allocation. The manner in which the transmission is performed may depend on a measurement performed by the WTRU of the wireless network and/or a cell of the wireless network. For example, the measurement may be indicative of a condition of the wireless network, such as the quality of a channel (e.g., a frequency channel) and/or a communication link (e.g., an air interface link). When the measurement indicates that the wireless network is in a first condition (e.g., a measured parameter is above a threshold), the WTRU may transmit the eMBB bit-stream and the URLLC bit-stream using multiple hierarchical modulation layers, for example where the eMBB bit-stream may be mapped to an enhancement layer and the URLLC bit-stream may be mapped to a base layer (for at least a subset of the resources). When the measurement indicates that the wireless network is in a second condition (e.g., a measured parameter is below a threshold), the WTRU may transmit the eMBB bit-stream and the URLLC bit-stream on a single modulation layer. For example, the eMBB data may be punctured to allow the URLLC data to be transmitted on resources indicated in the resource allocation (e.g., on a subset of the allocated resources).

A network device such as a base station may be configured to provide mixed services (e.g., transmit and/or receive data associated with different service types and/or different quality of service (QoS) requirements). For example, the network device may determine that a first bit-stream (e.g., an eMBB bit-stream) associated with a first priority and a second bit-stream (e.g., a URLLC bit-stream) associated with a second priority are to be transmitted to a WTRU, where the second priority may be higher than the first priority. The network device may determine, based on a condition of the network, whether to transmit the first bit-stream and the second bit-stream using a single modulation layer or using multiple hierarchical modulation layers (e.g., a base layer and an enhancement layer). Based on a determination that the condition of the network has a first characteristic (e.g., the condition is below a threshold level), the network device may transmit the first and second bit-streams to the WTRU via the single modulation layer. Based on a determination that the condition of the network has a second characteristic (e.g., the condition is above the threshold level), the network device may transmit the first and second bit-streams to the WTRU via the multiple hierarchical modulation layers. For example, the network device may transmit the first bit-stream on an enhancement layer and the second bit-stream on a base layer.

The WTRU may receive one or more indications from the network device regarding a transmission scheme used for mixed services. For example, the WTRU may receive downlink control information (DCI) from the network indicating that the WTRU will receive a transmission that utilizes hierarchical modulation. The DCI may indicate a first modulation and coding scheme (MCS) associated with a first hierarchical layer of the transmission and a second MCS associated with a second hierarchical layer of the transmission. The WTRU may subsequently receive the transmission that utilizes hierarchical modulation. The transmission may include a first bit-stream (e.g., an eMBB bit-stream) modulated using the first MCS at the first hierarchical layer and a second bit-stream (e.g., a URLLC bit-stream) modulated using the second MCS at the second hierarchical layer. The first bit-stream may be associated with a first priority and the second bit-stream may be associated with a second priority that is higher than the first priority. The WTRU may demodulate the first and second bit-streams based at least on the first MCS and the second MCS.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
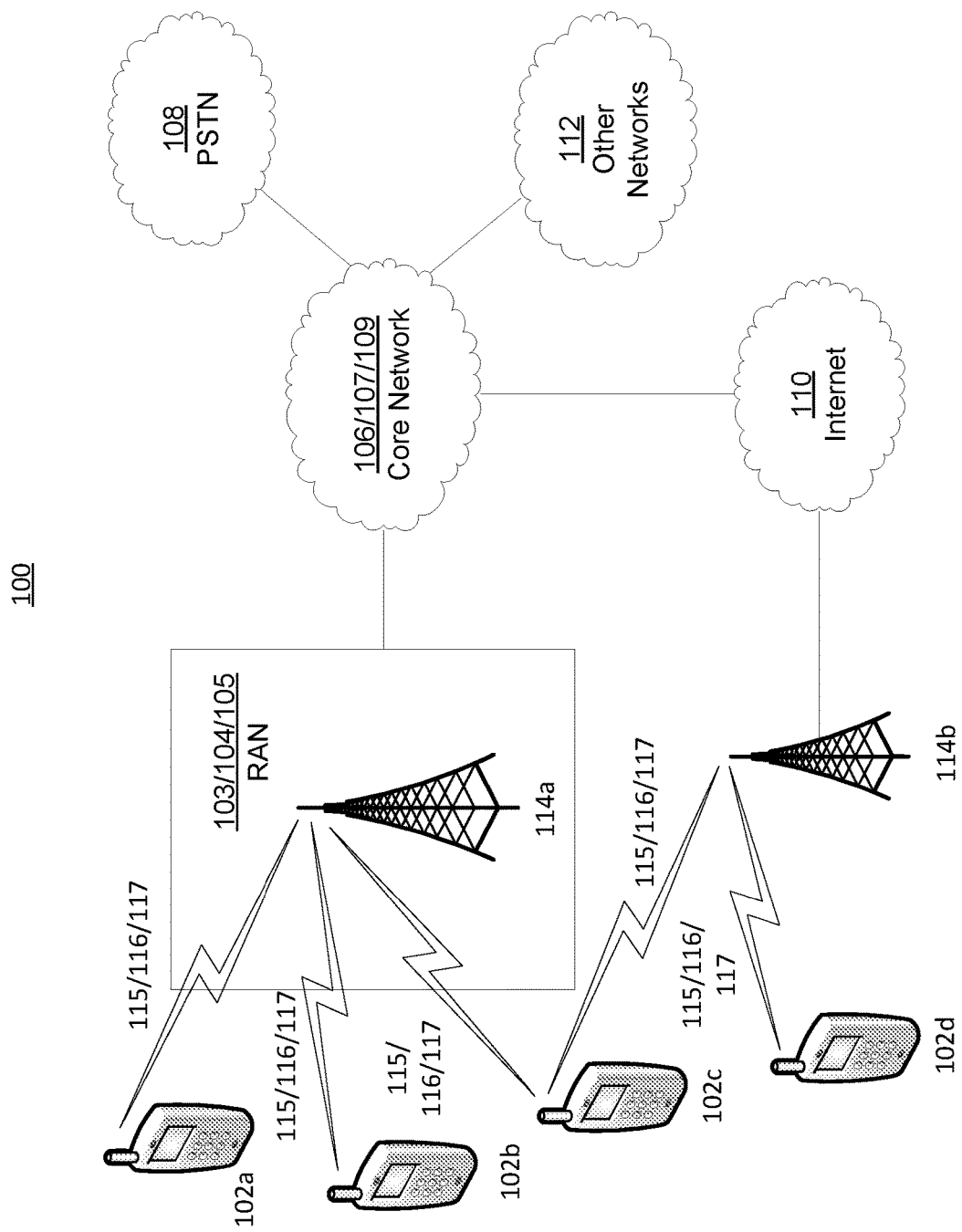
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a gNB, a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements. Further, examples described with respect to specific types of base stations (e.g., such as a gNB, which may be a base station for a 5G network) may be equally applicable to other base stations (e.g., such as an eNB).

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
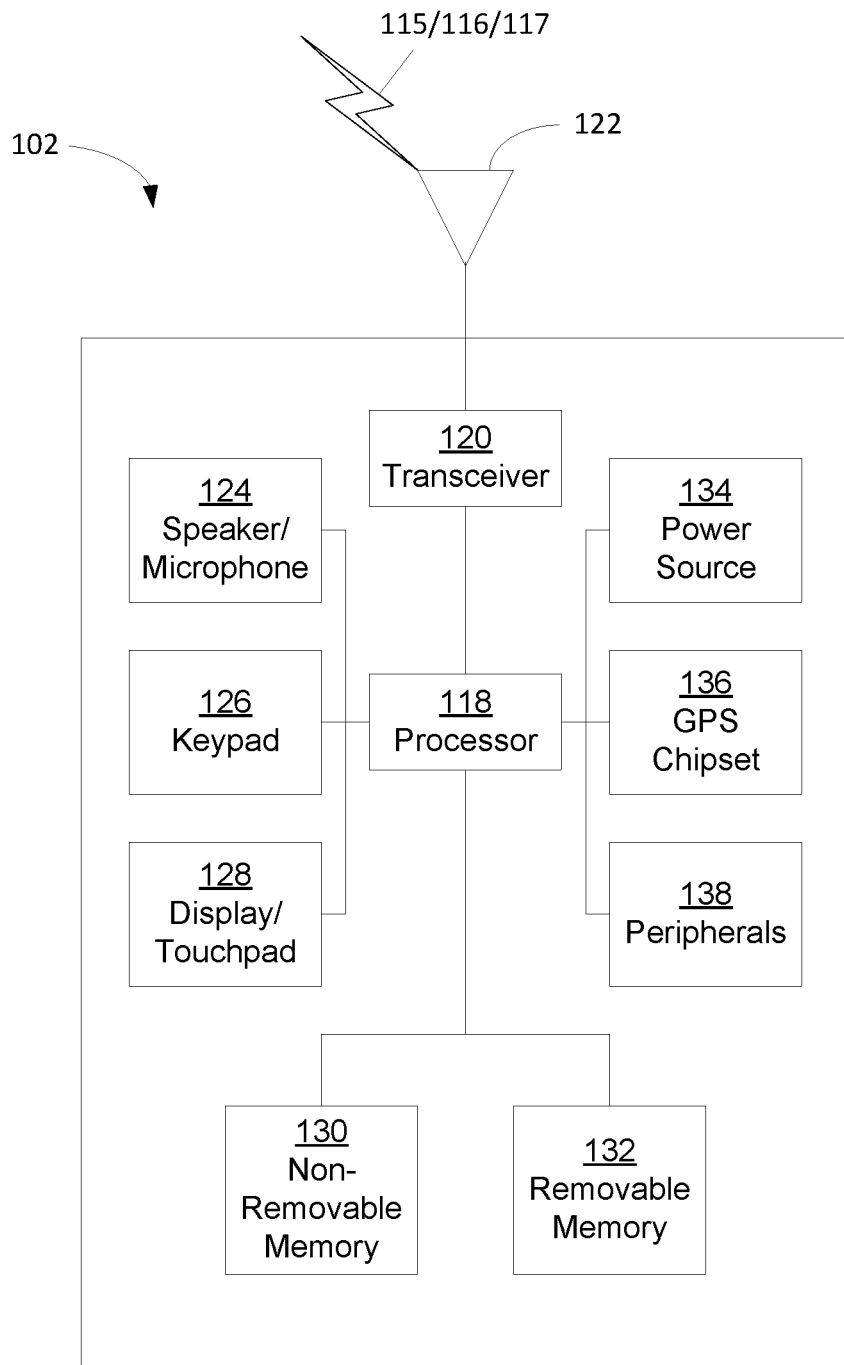
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
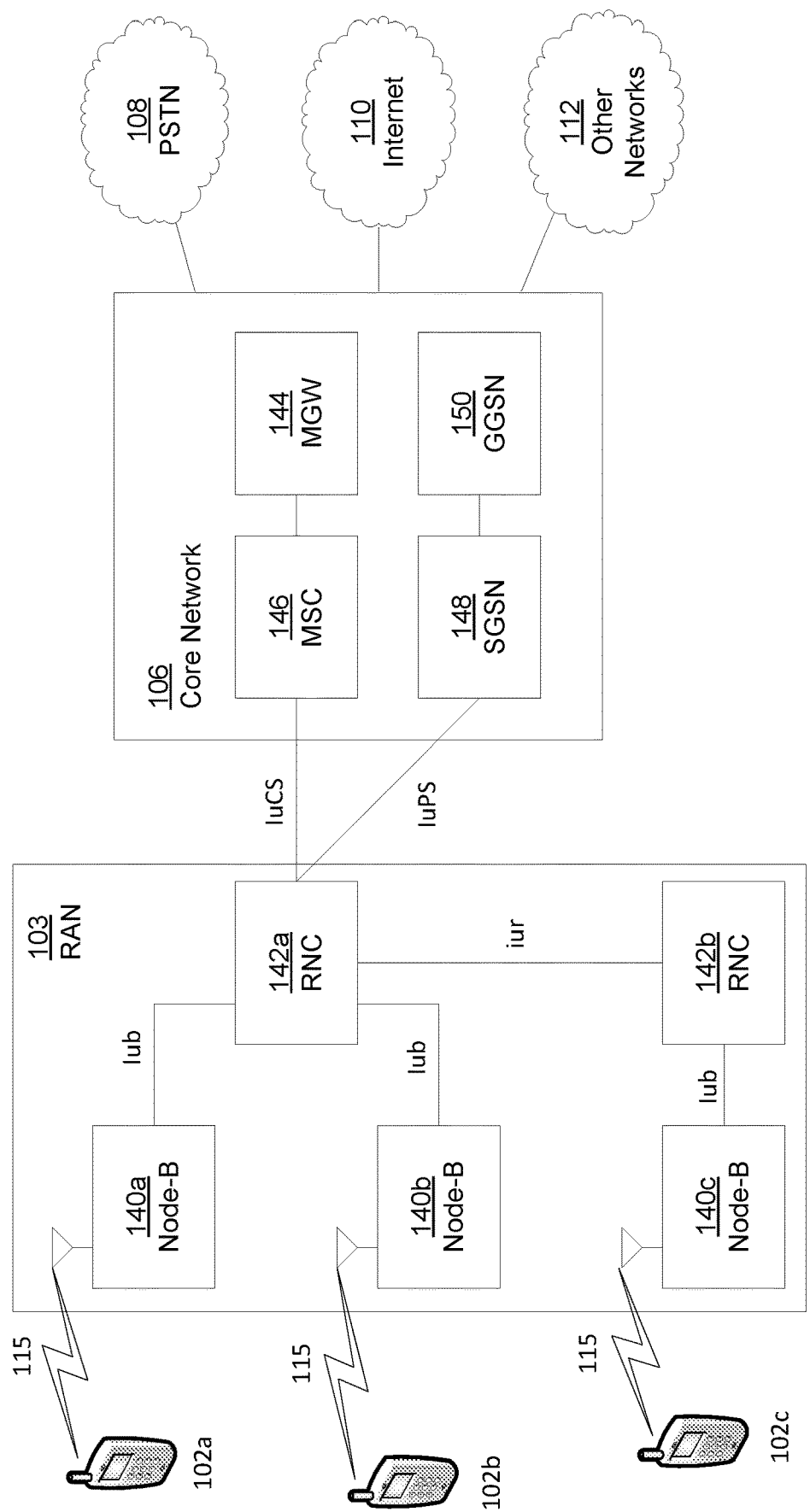
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
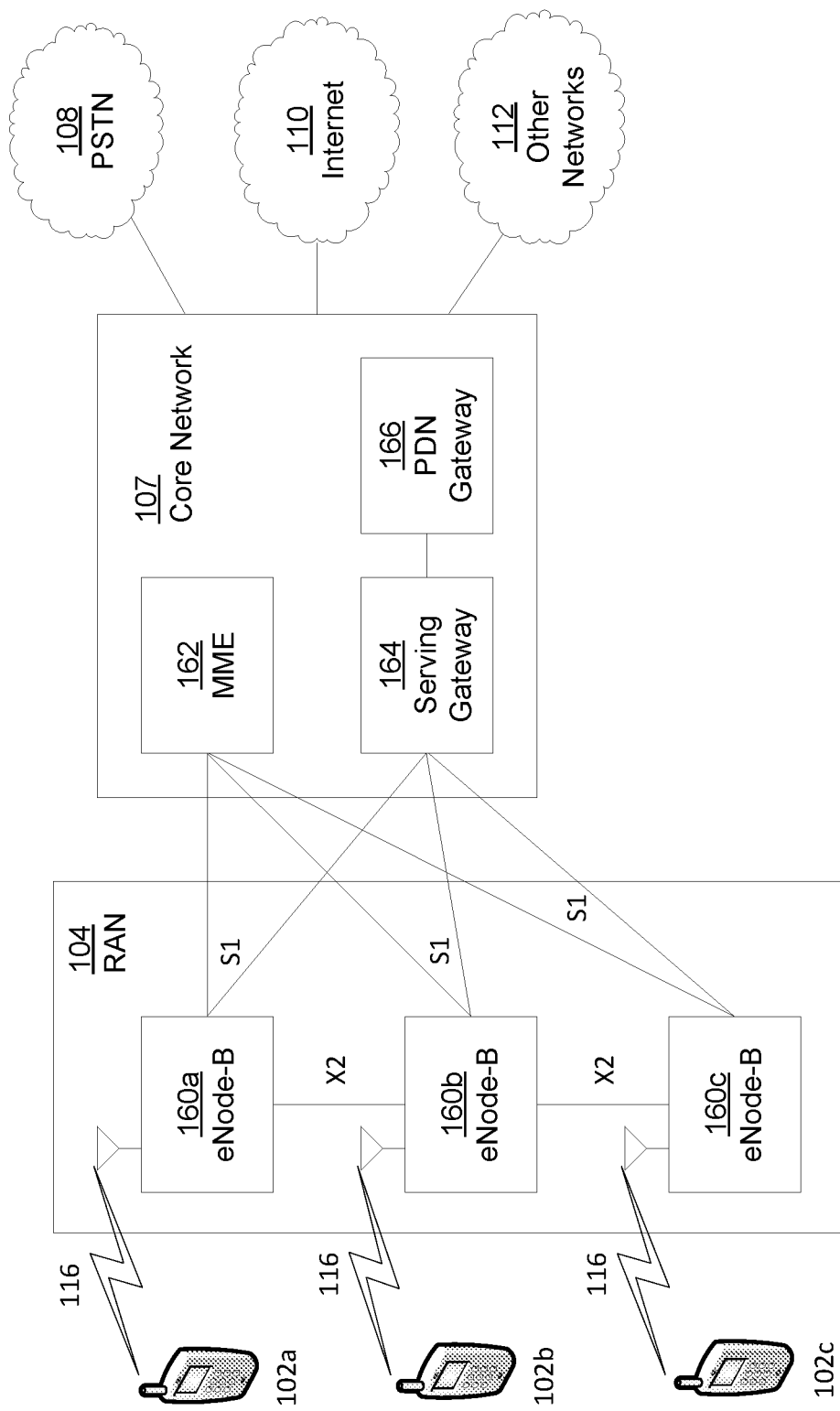
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
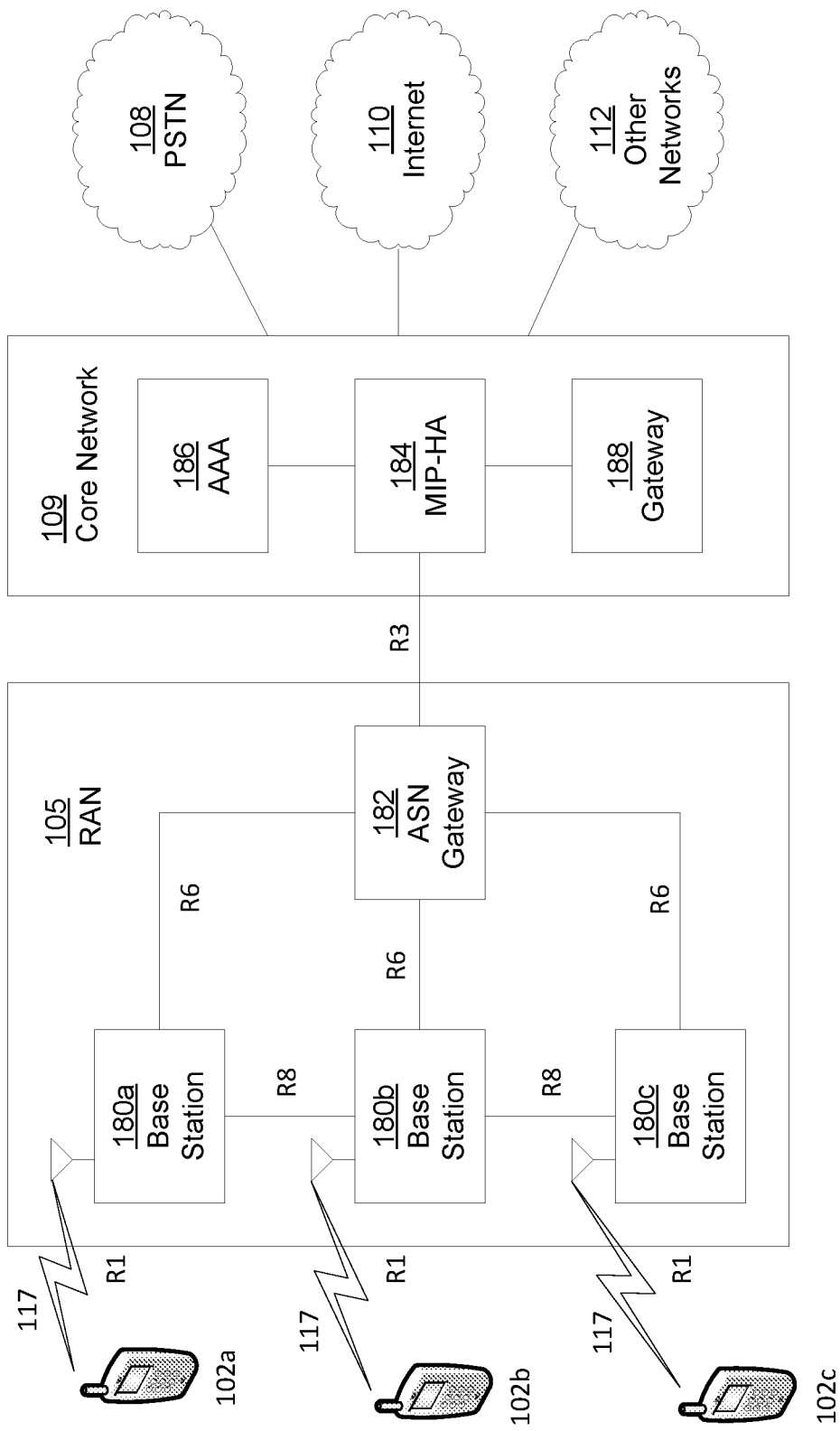
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A mobile communication system (e.g., a 5G system) may be used to transmit and/or receive different types of communications including, for example, Enhanced Mobile Broadband (eMBB) communications, Massive Machine Type Communications (mMTC), Ultra Reliable and Low Latency Communications (URLLC), and/or the like. The different types of communications may be suitable for different use scenarios. For example, some use scenarios may call for high data rates, while others may emphasize spectrum efficiency, low power consumption, low latency, and/or high reliability.

Certain application areas such as factory automation, remote tele-surgery, real time mobile control, and vehicle-to-vehicle applications may be configured to utilize URLLC communications. Transmission availability and reliability in URLLC may be driven by low error probability and low outage rate targets. For example, with URLLC, the target for user plane latency may be 0.5 millisecond (ms) for uplink (UL) and downlink (DL). The target for reliability may be $10^{-5}$ within a millisecond (e.g., within every millisecond). These performance targets may be difficult to meet in some mobile communication systems including those having a block error rate (BLER) target of 10% for data transmissions, a TTI duration of 1 ms, and/or one or more eNBs designated to control resource allocation and scheduling.

Figure 2:
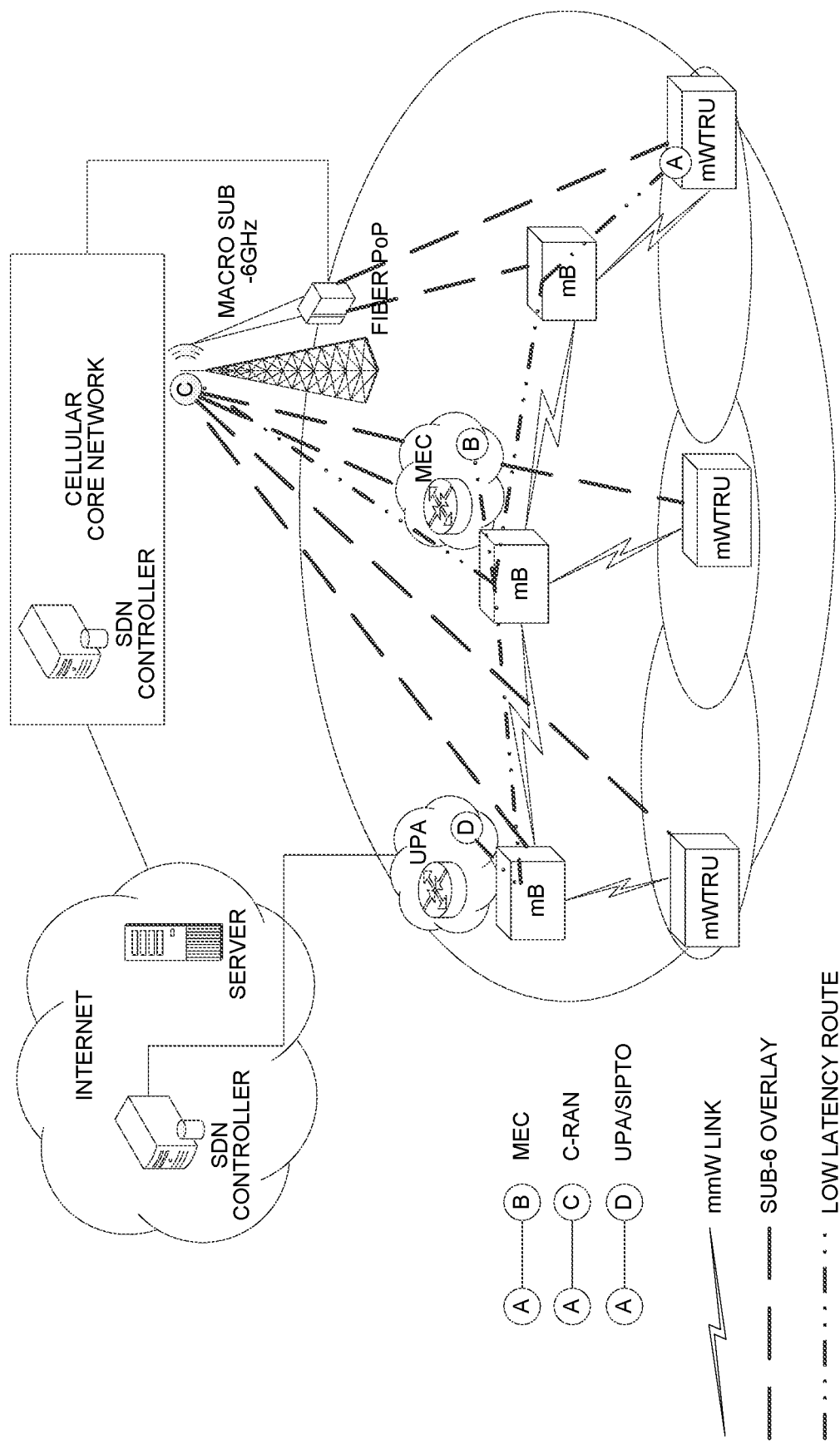
FIG. 2 shows an example architecture for a millimeter-wave (mmW) network.

FIG. 2 shows an example architecture of a mmW network such as an Ultra Dense Network (UDN). The mmW network may include one or more mmW links through which a base station (e.g., gNB) or a mmW base station (mB) may serve multiple WTRUs. An mB and/or other 5G type RAN nodes may also be referred to as a gNB. An mB, as used herein, may be or may include a small cell (SC) aggregation point. The SC aggregation point may support various types of traffic including, e.g., LTE or LTE-A traffic. Multiple mBs may be connected to each other wirelessly through the one or more mmW links. Each mB may be configured to reach a gateway mB through one or more wireless hops. A gateway mB, as referenced herein, may be a node with access (e.g., via a wired connection) to a core network or an IP cloud. A mmW node (e.g., all mmW nodes, including mBs and gateway mBs) may have a sub-6 GHz connection to a macro cell. A mmW software-defined networking (SDN) controller may be deployed within an operator core network or in an Internet cloud, for example. Mobile edge computing (MEC) may be deployed at one or more mmW small cells and/or macro cells. Further, although not shown, the system depicted in FIG. 2 may include selected IP traffic offload (SIPTO) and/or user plane application (UPA) options. Control plane overlay may be used to provide fast and reliable control over one or more of the systems.

When a WTRU accesses a network such as an mmW network (e.g., an mB) via an access link, a single-hop scenario may occur. When a WTRU accesses a network node such as a C-RAN baseband unit (BBU) via an access link and a fronthaul link, a single-hop extension or a two-hop scenario may occur. When a network node such as an mB accesses another network node such as a gateway mB through one or more wireless hops (e.g., in a wireless mesh topology), a multi-hop scenario may occur. Data communication latency may be reduced, and ultra-low latency transmission and reception may be accomplished at one or more components of the wireless network including, for example, at access links, at joint access links, at fronthaul links, and/or during data forwarding in a multi-hop environment. The techniques described herein may be employed in a single communication direction or in both communication directions for one or more of the access link(s), the joint access link(s), the fronthaul link(s), and/or during data forwarding in a multi-hop environment A communication system as described herein may be configured to provide high data rates and low latency together. For example, a reduction in round-trip time (RTT) latency or packet error rate may lead to an increase in the peak throughput for a given TCP window size. End-to-end delays between connected WTRUs may arise from one or more sources including, for example, transmission time intervals (TTIs), transmission and/or reception (TX/RX) processing time (e.g., such as decoding latency or signal processing time), Hybrid Automatic Repeat Request (HARQ) RTT, packet error rates, the number of HARQ retransmissions, grant acquisition time, grant scheduling time, and/or the like. A TTI may refer to a time duration (e.g., a subframe or slot) that may be used to transmit and/or receive a request, a grant, HARQ feedback, a channel (e.g., a control channel or data channel), and/or the like. Such a duration may be fixed, e.g., at 1 ms, and/or may be known to various devices in the system. Processing time (e.g., transmission and/or reception processing time) may include the time used by a WTRU and/or a base station to process (e.g., encode and/or decode) data and/or control information. Such processing time may be proportional to the size of a transport block (TB).

A wireless multi-hop network may suffer from delay associated with hop-by-hop sequential forwarding of wireless packets throughout the network. The delay may be a function of the number of hops and/or the size of the wireless packets. For example, the delay of a data packet may increase as the packet size increases or as the number of hops between the source and the destination increases. Data communications that include a data packet may suffer as the latency of the data packet increases.

Reliable and low latency communications may be accomplished by enhancing transmission reliability and/or by reducing the BER or packet error rate of the transmissions. WTRUs and/or network devices may be configured to support mixed use cases or mixed data traffic such as mixed low latency communications (e.g., in URLLC applications) and high data rate communications (e.g., in eMBB applications). The WTRUs and/or network devices may utilize techniques such as hierarchical modulation to transmit the mixed traffic, which may include multiple bit-streams associated with different levels of protection and/or implemented using different modulation layers. For example, the WTRUs and/or network devices may map a bit-stream associated with a higher level of protection to high priority bits of a hierarchical modulation framework, and a bit-stream associated with a lower level of protection to low priority bits of the hierarchical modulation framework.

Examples will be provided herein to illustrate how a wireless communication system may be configured to provide mixed data types and/or mixed services such as mixed URLLC and eMBB data and/or services. While some of the examples may be described in the context of downlink communications (e.g., from a base station to a WTRU) and/or as implemented in a network device (e.g., a base station), the relevant concepts and/or techniques illustrated herein (e.g., dynamic use of hierarchical modulation) may be applicable to other use scenarios and/or may be implemented in different types of devices. For example, the relevant concepts and/or techniques may be implemented in a WTRU for uplink transmissions from the WTRU to a network and/or in a network device for downlink transmission from the network to a WTRU. The techniques may also be used for network device to network communications, for example as part of a wireless fronthaul and/or backhaul. While some of the examples may be described in terms of mixed data types and/or mixed services, the relevant concepts or techniques illustrated herein may be applicable to other use scenarios. For example, the relevant concepts and/or techniques may be applicable to use scenarios involving multiple bearers, multiple channels, multiple data streams having different requirements (e.g., latency requirements, reliability requirements, QoS requirements, etc.), and/or the like.

Figure 3:
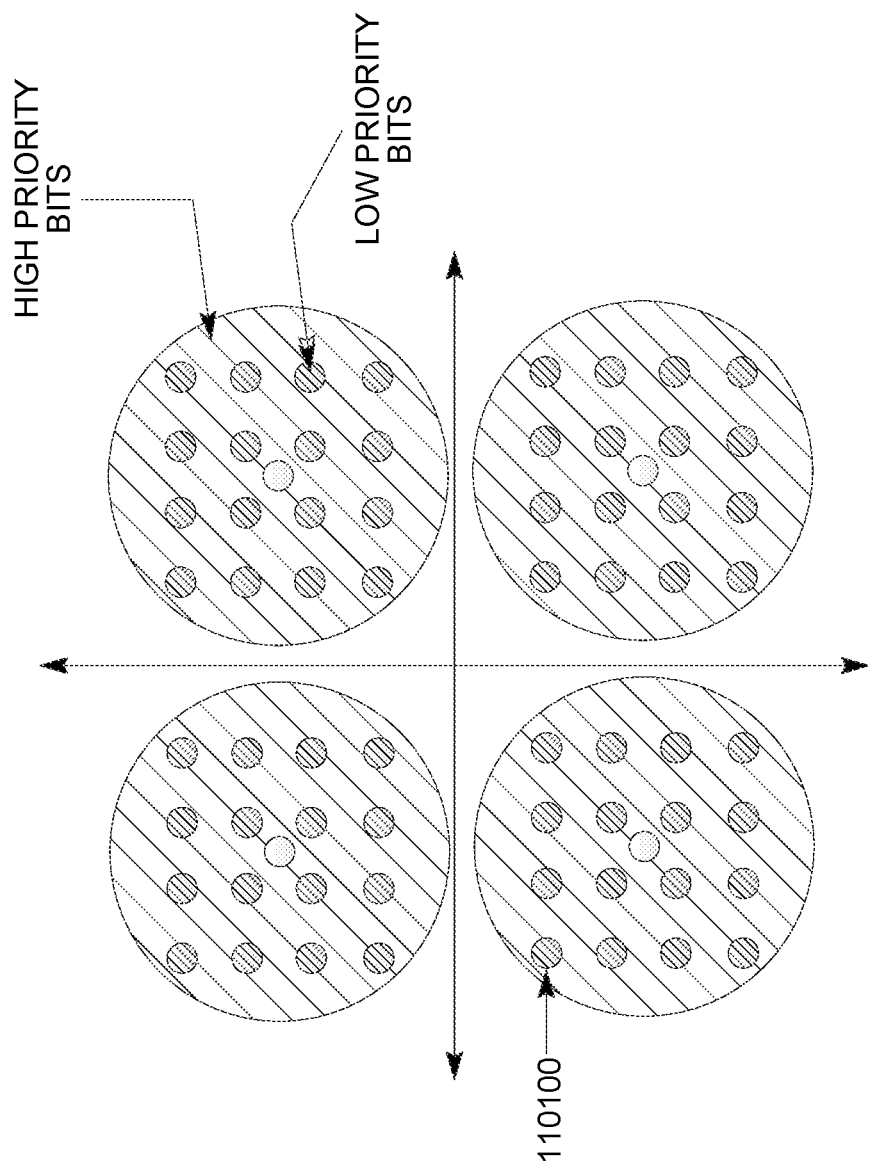
FIG. 3 shows an example of a hierarchical modulation signal constellation.

FIG. 3 shows an example of a hierarchical modulation signal constellation that may be utilized to provide mixed services. As shown, the signal constellation may include high priority bits and low priority bits. The high priority bits may correspond to a base layer of the hierarchical modulation. The high priority bits may be relatively resilient against background noise, e.g., due to larger spacing between constellation points. The low priority bits may correspond to an enhancement layer. The low priority bits may be relatively susceptible to noise, e.g., due to smaller spacing between constellation points (e.g., the constellation points are closer to each other compared to those in the base layer). A communication device (e.g., a base station or a WTRU) may be configured to mix (e.g., multiplex) different types of traffic (e.g., URLLC and eMBB traffic) using hierarchical modulation. The communication device may partition bits in a modulation symbol into multiple tiers including a high quality tier and a low quality tier. The partition may be based on BER or BLER, for example. The partitioned bits may be mixed (e.g., multiplexed) based on their respective priorities. For example, when the priority of URLLC outweighs that of eMBB, the communication device may assign high quality bits to URLLC and low quality bits to eMBB. When the priority of eMBB outweighs that of URLLC, the communication device may assign high quality bits to eMBB and low quality bits to URLLC. eMBB and URLLC are used herein as examples. Various other services and/or data types may also be assigned the higher priority bits and/or the lower priority bits.

The communication device (e.g., a base station or a WTRU) may be able to transmit the high priority bits of hierarchical modulation with fewer re-transmissions and/or lower average latency, e.g., due to the noise resilient nature of the high priority bits. In an example, the communication device may map URLLC data to high priority bits and control information to low priority bits of a hierarchical modulator. The communication device may multiplex certain control messages (e.g., high priority control messages such as ACK/NACK) with high priority bit-streams (e.g., URLLC bit streams) that may be mapped to high priority bits. The communication device may multiplex certain control messages (e.g., lower priority control messages such as rank indicator (RI), precoding matrix indicator (PMI), and/or channel quality indicator (CQI)) with low priority bit-streams that may be mapped to low priority bits. The multiplexing may be conducted in a hierarchical modulator of the communication device, for example.

The communication device (e.g., a base station or a WTRU) may be configured to control the hierarchical modulator to vary (e.g., dynamically vary) the number of bits assigned to low priority and high priority bit-streams. For example, the communication device may control the hierarchical modulator to vary the number of bits assigned to low priority and high priority bit-streams on various bases including, for example, on a per-subframe, per-slot, per-mini-slot (e.g., a duration shorter than a normal slot), per-short TTI, or per-OFDM symbol basis. The communication device may vary the number of bits assigned to low priority and high priority bit-streams per M OFDM symbols, where M may have a pre-defined or configurable value. Such dynamic adjustment of the bit assignment may improve the efficiency of scheduling operation, for example.

Figure 4:
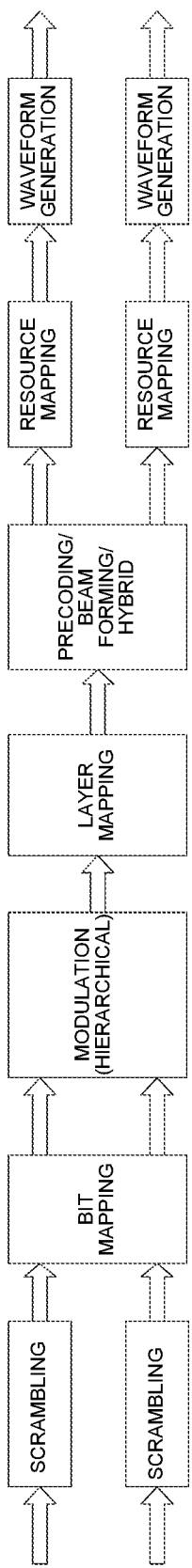
FIG. 4 shows an example diagram for generating a signal using hierarchical modulation.

FIG. 4 shows an example diagram for generating a signal (e.g., a mixed-service signal) using hierarchical modulation. The signal may be a baseband signal, for example. The signal may represent a physical channel. A communication device (e.g., a base station or a WTRU) may be configured to generate the signal by performing one or more of the following. The communication device may scramble coded bits to be transmitted on the physical channel. The communication device may perform bit mapping on the coded bits based on characteristics of the coded bits (e.g., the respective traffic types of the coded bits). For example, the communication device may perform bit mapping on the coded bits based on priorities associated with the coded bits (e.g., based on priorities associated with the respective traffic types of the coded bits). The communication device may modulate the scrambled bits to generate complex-valued modulation symbols, and map those complex-valued modulation symbols to one or more transmission layers. The communication device may perform precoding and/or beamforming (e.g., precoding, beamforming, or a hybrid of precoding and beamforming) on the complex-valued modulation symbols of one or more of the transmission layers so that the one or more of the transmission layers may be transmitted on one or more antenna ports. The communication device may map the complex-valued modulation symbols associated with an antenna port (e.g., each antenna port) to one or more resource elements, and generate complex-valued time-domain waveform (e.g., OFDM, DFT-s-OFDM, etc.) signals for the antenna port.

A communication device (e.g., a base station or a WTRU) may be configured to perform dynamically configurable hierarchical modulation. For example, the communication device may include a modulator and/or a demodulator that may support dynamically configurable hierarchical modulation. The modulator and/or demodulator may assist with the transmission and/or reception of independent bit-streams that are associated with different priorities. As discussed above, URLLC data may have higher reliability and lower latency requirements than eMBB data, and the communication device may assign URLLC data to high priority bits of the modulator and eMBB data to low priority bits of the modulator. A high priority bit-stream, which may include bits assigned to the high priority bits of the modulator, may have greater resilience to noise than a low priority bit-stream, which may include bits assigned to the low priority bits of the modulator. The high priority bit-stream may encounter fewer transmission failures (e.g., transmission of the high priority bit-stream may be accomplished with fewer re-transmissions). The high priority bit-stream may enhance transmission reliability and/or reduce overall transmission latency.

As described above, a communication device (e.g., a network device or a WTRU) may dynamically adjust the number of bits assigned to a specific type of traffic or bit-stream such as URLLC traffic, eMBB traffic, high priority traffic, low priority traffic, etc. The communication device may make the dynamic bit adjustment in response to channel state information and/or channel resource requirements. The channel state information may reflect instantaneous channel state information. The channel state information may include, for example, CQI, channel state information (CSI), signal-to-noise ratio (SNR), and/or other channel state related information such as ACK/NACK. The communication device may make (e.g., reconfigure) the bit adjustment per subframe, per slot, per mini-slot, per short TTI, per OFDM symbol, and/or per M OFDM symbols (e.g., M may have a pre-defined or configurable value). Greater details about the use of channel state information and/or channel resource requirements in dynamic configurations and/or reconfigurations of hierarchical modulation will be provided below.

A network (e.g., a base station) may signal to a WTRU a modulation and coding scheme (MCS) that may be associated with at least one bit-stream. For example, the network may signal to the WTRU respective MCS's associated with different bit-streams. The network may include one or more MCS's and/or information about the MCSs in Downlink Control Information (DCI). The one or more MCS's for the different bit-streams may be the same or may be different, for example depending on channel state information and/or channel resource requirements. Having multiple MCSs for different bit-streams may allow the network to perform scheduling tasks with more flexibility, to improve resource utilization, and/or the like.

Figure 5:
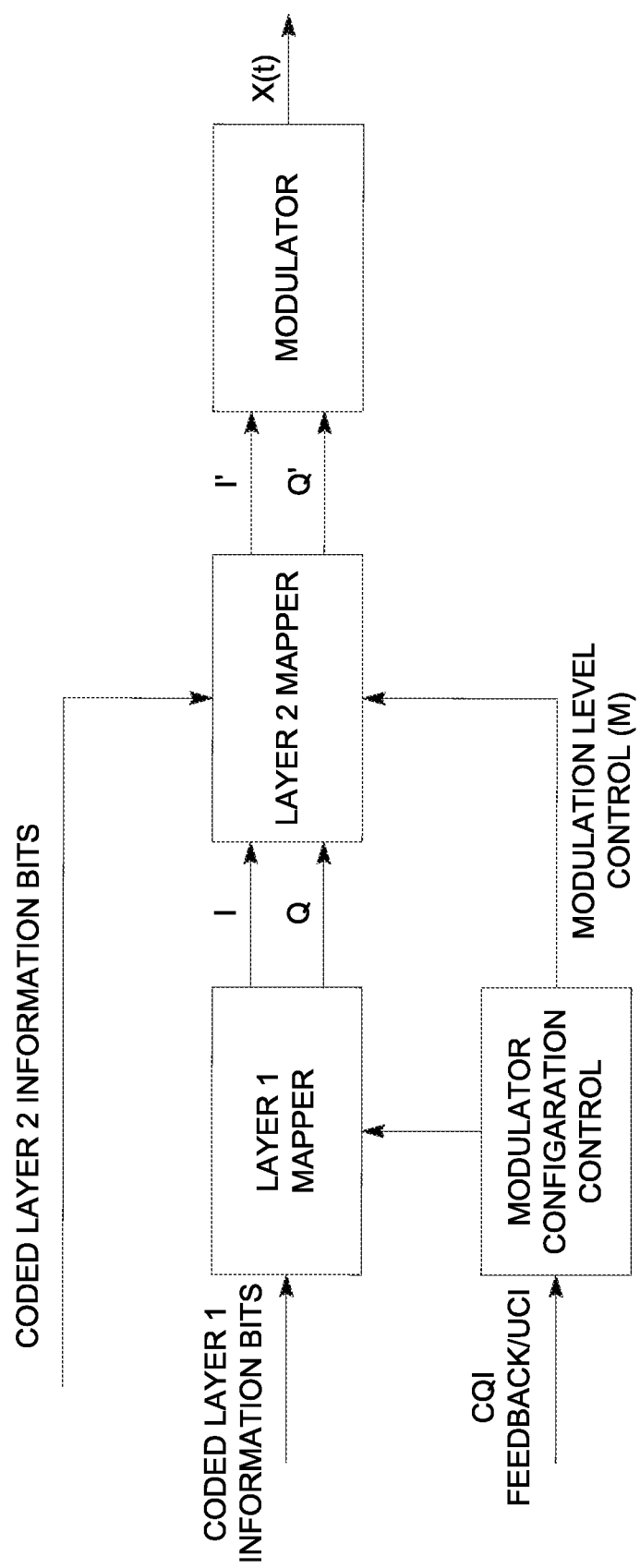
FIG. 5 shows an example of a dynamically configured hierarchical modulator.
Figure 6:
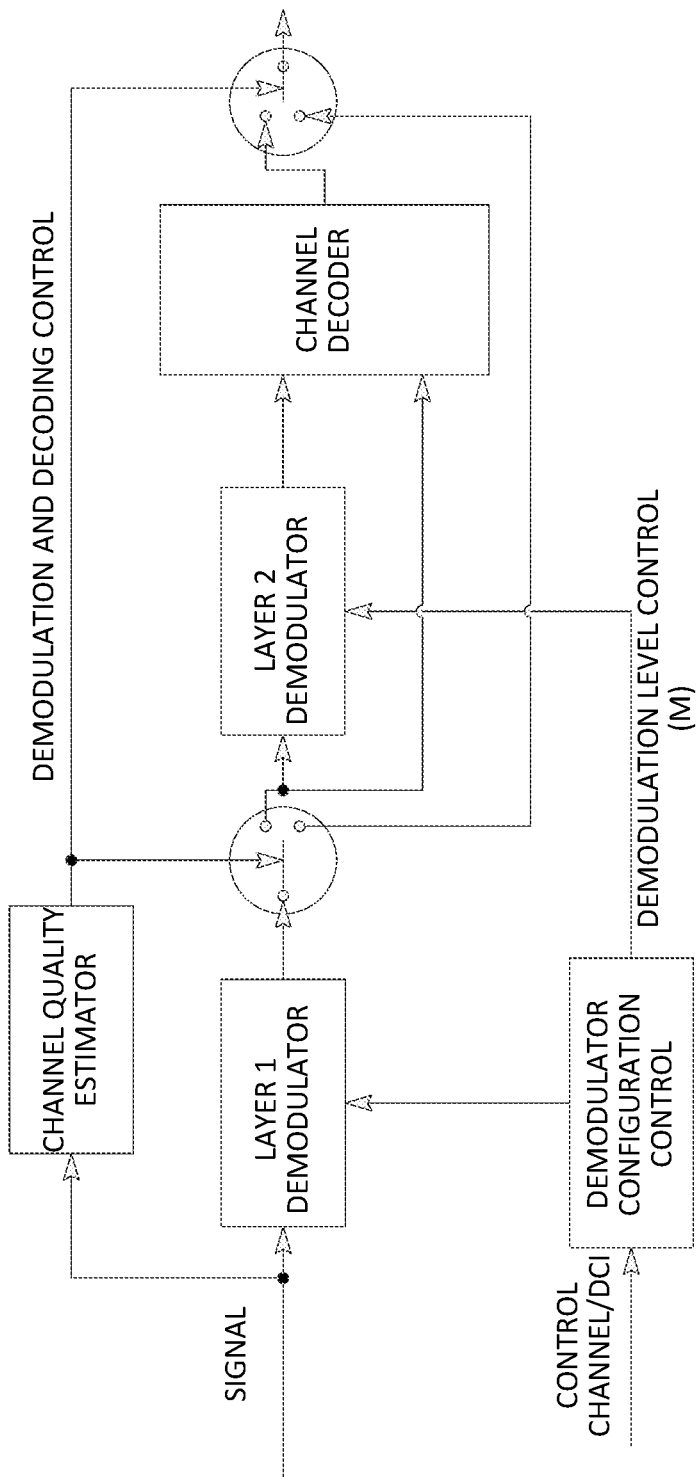
FIG. 6 shows an example of a dynamically configured hierarchical demodulator.

FIG. 5 shows an example of a hierarchical modulator that may be dynamically configured. For example, the hierarchical modulator shown in FIG. 5 may be an example of implementing hierarchical modulation in the downlink when the transmission is sent from a network node (e.g., gNB) to a WTRU. FIG. 6 shows an example of a hierarchical demodulator that may be dynamically configured. For example, the hierarchical demodulator shown in FIG. 6 may be an example of implementing hierarchical demodulation in the downlink when the transmission is sent from a network node (e.g., gNB) to a WTRU. The examples described with respect to FIGS. 5 & 6 may use eMBB and URLLC data transmitted in the downlink as an example, but as is described further below, the modulator may be located at a WTRU and the demodulator may be located a network node (e.g., gNB) for uplink transmissions.

For example, as illustrated in FIG. 5, a network device (e.g., a base station) may be configured to transmit mixed eMBB data and URLLC data to a WTRU. The WTRU may be configured to demodulate the mixed data using the demodulator shown in FIG. 6. The eMBB data may have a first priority and the URLLC data may have a second priority that is higher than the first priority. The network device may determine the respective priorities of the eMBB and URLLC data, and transmit the data in accordance with their associated priorities. For example, the network device may assess a condition of the wireless network and determine, based on the condition, whether to transmit the eMBB and URLLC data using a single modulation layer or using multiple modulation layers (e.g., multiple hierarchical modulation layers). The condition of the wireless network may be assessed based on measurements (e.g., measurement reports received from the WTRU) of one or more of the following parameters or components: CQI, PMI, RI, SNR, reference signal received power (RSRP), measurement reference signals (MRS), CSI reference signals (CSI-RS), synchronization signals such as primary synchronization signals (PSS) and secondary synchronization signals (SSS), and/or the like.

The network device may determine, based on the measurements described herein, that the condition of the wireless network is sufficiently robust (e.g., having a first characteristic or above a certain threshold) to permit the use of multiple modulation layers. The network device may de-multiplex the URLLC and eMBB data into respective first layer (e.g., layer 1) and second layer (e.g., layer 2) (e.g., at the modulator shown in FIG. 5). The modulator may include a layer 1 mapper configured to map layer 1 bits, $\bar{b}_1$, to hierarchical symbol, $S_1$. The layer 1 mapper may perform the mapping based on (e.g., as a function of) CQI provided in uplink control information (UCI), e.g., via the physical uplink control channel (PUCCH) and/or physical uplink shared channel (PUSCH). This operation may be illustrated in Eq. 1 below:

$$S_1 = f_1(\bar{b}_1, CQI) \qquad \text{Eq. 1}$$

The modulator may further include a layer 2 mapper to which the hierarchical symbol, $S_1$, may be sent. The modulator may map, based on the network condition (e.g., as a function of CQI) and/or the hierarchical symbol, $S_1$, layer 2 bits, $\bar{b}_2$, to the actual symbol, $S$, that is to be transmitted. This operation may be illustrated in Eq. 2 below:

$$S = f_2(\bar{b}_2, S_1, CQI) \qquad \text{Eq. 2}$$

If the network device determines, based on the measurements described herein, that the condition of the wireless network is not robust enough to permit the use of multiple modulation layers (e.g., the condition has a second characteristic or is below a certain threshold), the network device may use a single modulation layer to transmit bits mapped by the layer 1 mapper. Either URLLC or eMBB data may be mapped to layer 1 bits when a single layer is used, in which case the actual symbol, $S$, to be transmitted may be the same as the hierarchical symbol, $S_1$.

The network device may indicate to a WTRU the scheme used to modulate the eMBB and URLLC data such that the WTRU may properly receive and/or process the modulated data. For example, based on the received feedback (e.g., CQI feedback), the network device may decide to employ a first modulation scheme (e.g., Quadrature Phase Shift Keying (QPSK), Quadrature amplitude modulation (QAM) such as 4-QAM, 8-QAM, 16-QAM, 32 QAM, 64-QAM, etc., and/or other modulation schemes), or a second modulation scheme (e.g., a hierarchical modulation scheme) in the transmission of the eMBB and URLLC data. The network device may further indicate to the WTRU the respective modulation and coding schemes (MCSs) (e.g., more than one MCS) associated with the eMBB and URLLC bit-streams. The network device may include one or both of the foregoing indications in the DCI, which may transmitted via the physical downlink control channel (PDCCH) or the physical downlink shared channel (PDSCH).

In response to receiving the indication(s) associated with the eMBB and URLLC data streams in the DCI, the WTRU may identify a hierarchical MCS based on the indication(s). If the DCI indicates that a single layer of data is present, the WTRU may estimate (e.g., directly estimate) a message, $\hat{b}$, using a layer 1 demodulator as shown in FIG. 6, for example. If the DCI indicates that multiple (e.g., two) layers of data are present, the WTRU may derive, e.g., via a channel quality estimator, a first hierarchical symbol estimate, $\hat{y}_1$, based on the identified hierarchical MCS and a received signal, y. The WTRU may then estimate, at the layer 1 demodulator, high priority data, $\hat{b}_1$, based on the hierarchical symbol estimate, $\hat{y}_1$, and the hierarchical MCS. The foregoing operations may be illustrated, for example, by Eq. 3 and Eq. 4 below, wherein $r_1$ and $B_1$ may represent estimators for the first priority symbol $\hat{y}_1$ and high priority data $\hat{b}_1$, respectively.

$$\hat{y}_1 = r_1(y, MCS) \qquad \text{Eq. 3}$$

$$\hat{b}_1 = B_1(\hat{y}_1, MCS) \qquad \text{Eq. 4}$$

The WTRU may estimate low priority data (e.g., eMBB data), $\hat{b}_2$, via a layer 2 demodulator. For example, the WTRU may derive, e.g., via the channel quality estimator, a second hierarchical symbol estimate, $\hat{y}_2$, based on the hierarchical MCS, the received signal, y, and the hierarchical symbol estimate, $\hat{y}_1$. The WTRU may then estimate, at the layer 2 demodulator, the low priority data, $\hat{b}_2$, based on the hierarchical symbol estimate, $\hat{y}_2$, and the hierarchical MCS. The foregoing operations may be illustrated, for example, by Eq. 5 and Eq. 6 below, wherein $r_2$ and $B_2$ may represent estimators for the second priority symbol $\hat{y}_2$ and low priority data $\hat{b}_2$, respectively.

$$\hat{y}_2 = r_2(y, \hat{y}_1, MCS) \quad \text{Eq. 5}$$

$$\hat{b}_2 = B_2(\hat{y}_2, MCS) \quad \text{Eq. 6}$$

Dynamically configured hierarchical modulation and demodulation may also be used when URLLC and eMBB transmissions are intended for or are originated from different WTRUs that are located at different locations. In those scenarios, network conditions (e.g., channel states and/or CQIs) may vary among the different WTRUs. Using downlink transmissions in those scenarios as an example, a network device (e.g., a base station) may de-multiplex data intended for the different WTRUs into a first layer (e.g., layer 1) and a second layer (e.g., layer 2), respectively. The network device may include a layer 1 mapper configured to map layer 1 bits, $\hat{b}_1$, to a hierarchical symbol, $S_1$. The mapping may be conducted based on a first CQI (e.g., which may be associated with a first WTRU) provided in the UCI (e.g., via the PUCCH or PUSCH). This may be illustrated, for example, by Eq. 7 below:

$$S_1 = f_1(\bar{b}_1, CQI_1) \quad \text{Eq. 7}$$

The network device may determine that a second CQI (e.g., which may be associated with a second WTRU) is higher than the first CQI, and send the hierarchical symbol, $S_1$, to a layer 2 mapper. The network device may map, using the layer 2 mapper, layer 2 bits, $\bar{b}_2$, to the actual symbol, $S$, that is to be transmitted. This may be illustrated, for example, by Eq. 8 below.

$$S = f_2(\bar{b}_2, S_1, CQI_2) \quad \text{Eq. 8}$$

The network device may indicate the hierarchical modulation format used to modulate the data in DCI and may transmit the indication via the PDCCH or the PDSCH. A WTRU may receive the format indication and process the modulated data accordingly. For example, the WTRU may, upon receiving the indicated format, identify a hierarchical MCS from the DCI. If the DCI indicates that a single layer is used to modulate the data, the WTRU may estimate a message, $\hat{b}$, directly from a layer 1 demodulator. If DCI indicates that multiple (e.g., two) modulation layers are used to modulate the data, and the WTRU is assigned a higher priority data layer, the WTRU may estimate a message, $\hat{b}$, directly from a layer 1 demodulator. The WTRU may skip estimating a second layer, if the DCI indicates that the second layer is addressed to another WTRU. If the DCI indicates that multiple (e.g., two) modulation layers are used to modulate the data, and the WTRU is assigned a lower priority layer (e.g., the WTRU is only assigned the lower priority layer), the WTRU may estimate, at the layer 1 demodulator, high priority data (e.g., URLLC data), $\hat{b}_1$, from the received signal, y, and may provide a hierarchical symbol estimate, $\hat{y}_1$, in accordance with Eq. 9 and Eq. 10 below:

$$\hat{y}_1 = r_1(y, MCS_1) \quad \text{Eq. 9}$$

$$\hat{b}_1 = B_1(\hat{y}_1, MCS_1) \quad \text{Eq. 10}$$

The WTRU may estimate low priority data (e.g., eMBB data), $\hat{b}_2$, using the received signal y and the higher priority symbol estimate $\hat{y}_1$, for example, in accordance with Eq. 11 and Eq. 12 below:

$$\hat{y}_2 = r_2(y, \hat{y}_1, MCS_2) \quad \text{Eq. 11}$$

$$\hat{b}_2 = B_2(\hat{y}_2, MCS_2) \quad \text{Eq. 12}$$

A communication device (e.g., a base station or a WTRU) may determine whether to employ hierarchical modulation (e.g., for mixed services) based on a condition of the wireless network. The condition may be associated with one or more aspects of the wireless network such as the quality of a channel (e.g., a radio channel, a frequency channel, a transmission channel, a data channel, etc.) as reflected through CSI, CQI, PMI, RI, SNR, and/or the like. The communication device may determine the condition (e.g., channel quality) based on a measurement of the wireless network. The measurement may be of or related to the SNR, RSRP, CSI-RS, MRS, and/or a synchronization signal (e.g., such as PSS, SSS) of the wireless network, for example. The measurement may be used to determine or represent the condition (e.g., the channel quality), for example.

Hierarchical modulation may be used for all of the resources associated with a given transmission or for a subset of the resources for the transmission. For example, a URLLC message (e.g., a URLLC transport block) may use fewer resources than an eMBB message. The hierarchical modulation may be used for sufficient resources to transmit the URLLC message, and the remaining resources may be used for transmission of the eMBB data using a single modulation layer.

Although examples of dynamically configurable hierarchical modulation techniques are described above in the context of downlink communications from a network device (e.g., a base station) to a WTRU, the techniques may also be employed in uplink transmissions, e.g., from a WTRU to the wireless network. For instance, a WTRU may be configured to transmit mixed bit-streams such as mixed eMBB and URLLC bit-streams. The WTRU may receive, from the wireless network, a resource allocation (RA) associated with a first bit-stream (e.g., an eMBB bit-stream). The first bit-stream may include data configured with a first priority (e.g., based on specific characteristics of the concerned eMBB application or use case). Before the WTRU has an opportunity to transmit the first bit-stream, the WTRU may determine that a second bit-stream (e.g., a URLLC transmission) with a higher priority than the first priority is awaiting transmission. In such scenarios, the WTRU may determine to transmit the first bit-stream and the second bit-stream together using at least a subset of the resources allocated by the wireless network.

The WTRU may determine a scheme for transmitting the two bit-streams based on a measurement of the wireless network. Such a measurement may be indicative of a condition (e.g., channel quality) of the wireless network, for example. If the measurement indicates that the wireless network is in a first condition (e.g., when channel quality is above a certain threshold), the WTRU may transmit the first and second transmissions in the RA (e.g., a subset of the resource allocation) using multiple hierarchical modulation layers. For instance, the second, higher priority bit-stream may be mapped to a base layer, and the first, lower priority bit-stream may be mapped to an enhancement layer for at least a subset of the resource elements of the transmission.

If the measurement indicates that the wireless network is in a second condition (e.g., when channel quality is below the threshold), the WTRU may transmit the first and second bit-streams with a single modulation layer. For instance, the WTRU may transmit the second transmission in the subset of the RA by pre-empting (e.g., puncturing) at least a portion of the first transmission in the subset of the RA or rate-matching the first transmission around the resource elements (REs) of the subset of the RA. The WTRU may transmit one or more of the following indications (e.g., as part of control information) to the network. The WTRU may transmit an indication to indicate the scheme (e.g., a multiplexing scheme) used for the mixed data transmission. The WTRU may transmit indication that hierarchical modulation was used. The WTRU may transmit an indication as to which MCSs were used for the different modulation layers. The WTRU may transmit an indication as to which resources are associated with the hierarchical modulation (e.g., if a subset of the resources use hierarchical modulation), and/or the like. The WTRU may include the one or more indications with the mixed transmission. The WTRU may also provide the indication in a separate transmission (e.g., such as in a control channel) that may follow the mixed transmission (e.g., being appended to the end of the mixed transmission).

In an example, the WTRU may receive a configuration (e.g., via radio resource control (RRC) signaling) that indicates one or more transmission parameters to be used should a transmission using hierarchical modulation be performed. For example, the configuration may be used to determine which subset of resources of a resource allocation should be used to perform the transmission using hierarchical modulation (e.g., and/or which resources should use a single modulation layer), for example when hierarchical modulation is to be used in a subset of resources of the RA. As an example, the WTRU may receive a relatively large grant for transmission of a first type of data (e.g., eMBB data). Prior to sending the transmission on the granted resources, the WTRU may determine that a second, higher priority data (e.g., URLLC data) is ready for transmission. The URLLC data may be smaller than the eMBB data, and the configuration may indicate which subset of resources within the grant should be used for sending the combination of the first data (e.g., eMBB) and the second data (e.g., URLLC) using hierarchical modulation. The remaining resources may be used for sending the first data (e.g., eMBB) using a single modulation layer. The configuration message may further indicate the modulation scheme to use for one or both of the modulation layers. By using the configuration, the WTRU may be able to dynamically send the hierarchical modulation message without signaling the specific parameters (e.g., indication of which resource elements and/or which MCSs were used) for the hierarchical modulation transmissions. Further, if the WTRU determines based on measurements that a single modulation layer can be supported, the configuration may indicate the resources (e.g., resource elements, resources blocks, etc.) that should be punctured to include the higher priority first data (e.g., URLLC data) within a larger transmission of lower priority second data (e.g., eMBB data).

Figure 7:
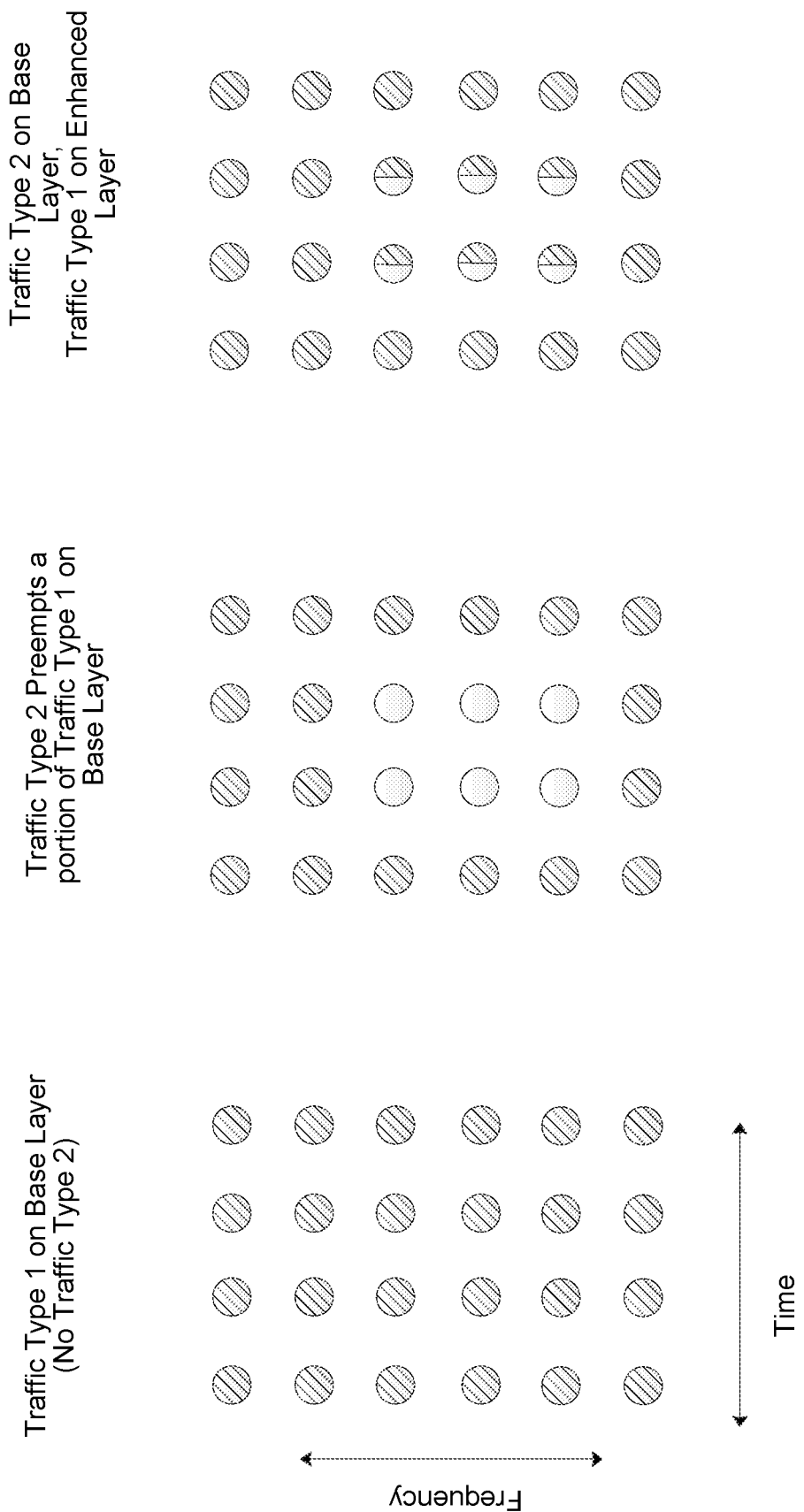
FIG. 7 shows an example diagram for transmitting mixed data using hierarchical modulation.

FIG. 7 shows an example diagram for transmitting mixed data from a communication device using hierarchical modulation. The communication device may be a network node or device such as a WTRU, a base station (e.g., gNB), a transmission reception point (TRP), and/or the like. The communication device may be configured to transmit a first type of traffic (e.g., Traffic Type 1) and a second type of traffic (e.g., Traffic Type 2). Traffic Type 1 may include, for example, URLLC or eMBB traffic. Traffic Type 2 may include the same type of traffic as Traffic Type 1, or may include a different type of traffic. Either or both of Traffic Type 1 and Traffic Type 2 may include data (e.g., such as user plane data or control plane data) and/or control information (e.g., such as physical layer control information).

Traffic Type 1 may differ from Traffic Type 2 in one or more of the following aspects. Traffic Type 1 and Traffic Type 2 may include different types of data and/or control information. For example, Traffic Type 1 may include eMBB data while Traffic Type 2 may include URLLC data. As another example, Traffic Type 1 and Traffic Type 2 may include different control channels or control information, different data channels or data, etc.

Traffic Type 1 and Traffic Type 2 may have different priorities, different QoS requirements, different delay tolerance, different reliability requirements, and/or the like. For example, one or more characteristics of Traffic Type 2 may give Traffic Type 2 higher priority or more importance than Traffic Type 1. The characteristics may be configurable, for example by a gNB or a TRP. For instance, the gNB or the TRP may configure the importance or priority (e.g., relative importance or priority) of a traffic type.

Using a WTRU as a non-limiting example of a node or device, the WTRU may transmit Traffic Type 1 (e.g., eMBB data) on a base layer when there is no Traffic Type 2 (e.g., URLLC data) to transmit. The WTRU may receive a resource allocation (e.g., a grant) associated with Traffic Type 1. The resource allocation may be designated for at least Traffic Type 1, and may include a set of time and/or frequency resources. The WTRU may transmit Traffic Type 1 using at least a subset of the resource allocation.

The WTRU may subsequently determine that Traffic Type 2 is awaiting transmission. The WTRU may select a subset of the resources allocation associated with Traffic Type 1 to transmit Traffic Type 2. The WTRU may determine a measurement associated with the concerned wireless network. The WTRU may compare the measurement (e.g., a measurement report or a measurement value) against a certain threshold. Based on whether the measurement is above or below the threshold, the WTRU may determine a scheme for mixing (e.g., combining or multiplexing) Traffic Type 1 and Traffic Type 2 so that the two types of traffic may be transmitted together.

If the WTRU determines that the measurement of the wireless network is below the threshold, the WTRU may transmit Traffic Type 1 and Traffic Type 2 on a single modulation layer. For instance, the WTRU may cause at least a portion of Traffic Type 1 to be preempted by Traffic Type 2 on the base layer. The preemption may be achieved by puncturing (e.g., replacing) Traffic Type 1 on the base layer with Traffic Type 2. The puncturing may be applied at different levels including, for example, at a symbol level, at a physical resource block (PRB) level, or at a resource element (RE) level. The puncturing may be performed in the subset of resources that the WTRU has selected for transmitting Traffic Type 2.

If the WTRU determines that the measurement is above the threshold, the WTRU may multiplex Traffic Type 1 and Traffic Type 2 on multiple modulation layers using hierarchical modulation techniques. For instance, the WTRU may transmit Traffic Type 2, which has higher priority, on a base layer, and Traffic Type 1, which has lower priority, on an enhancement layer. The mixed transmission may be performed in the subset of resources that the WTRU has selected for transmitting Traffic Type 2.

Figure 8:
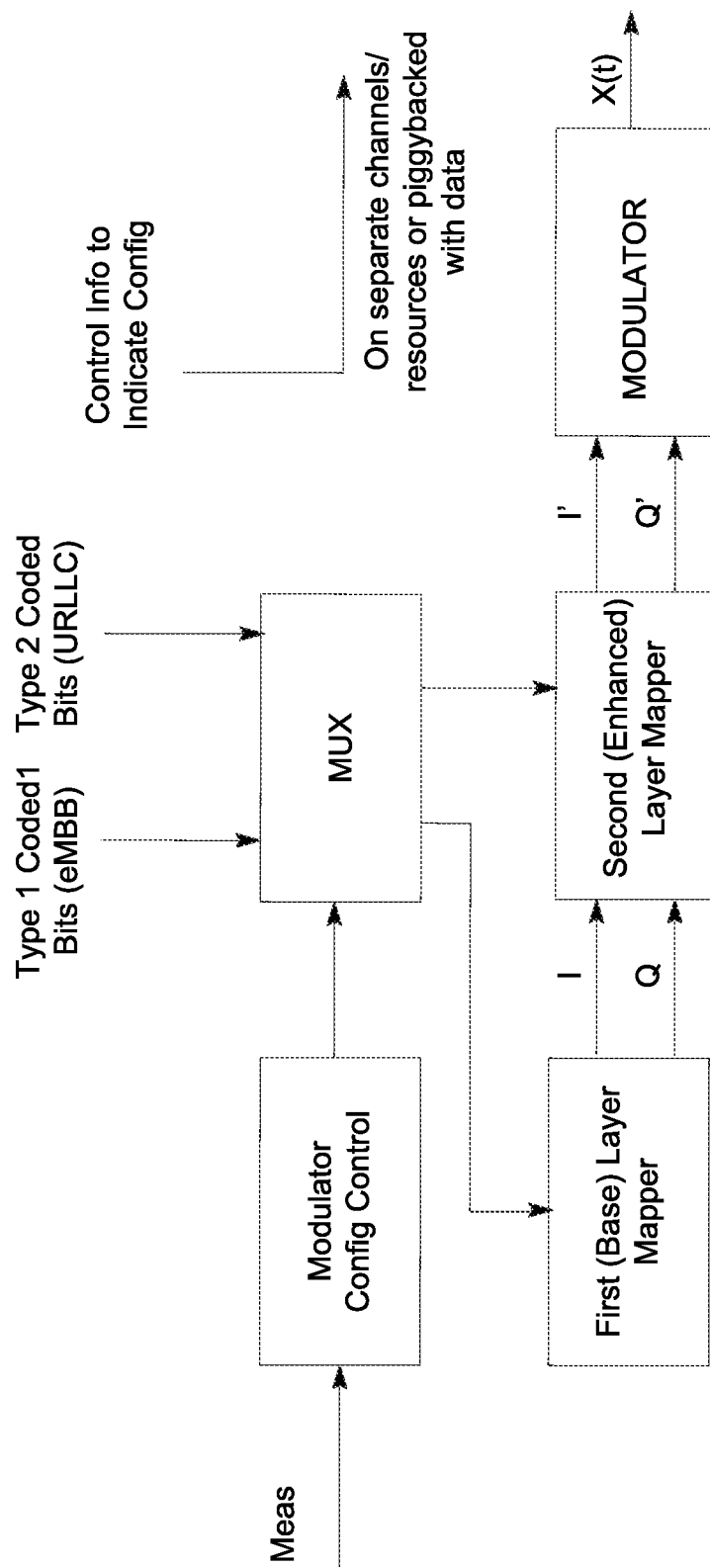
FIG. 8 shows an example diagram for dynamically configuring and performing hierarchical modulation based on a network condition.

FIG. 8 shows an example diagram for dynamically configuring and applying hierarchical modulation based on a network condition (e.g., a measurement of the network condition). As shown, two sets (e.g., different types) of data and/or control information such as those related to eMBB and URLLC applications may be multiplexed on the same resources for transmission, for example via a base layer mapper and/or an enhancement layer mapper. A multiplexing scheme may be selected based on a network condition (e.g., a measurement of channel quality). The multiplexing scheme may utilize preemption (e.g., puncturing or rate-matching) or hierarchical modulation techniques, as described herein. Control information may be provided to indicate the multiplexing scheme employed in the mixed data transmission. The control information may be transmitted on a separate channel or using separate resources than those used for the mixed data transmission. The control information and/or the multiplexing scheme may indicate (e.g., explicitly or implicitly) the resources used for the multiplexing. The control information and/or the multiplexing scheme may indicate (e.g., explicitly or implicitly) the type of traffic being transmitted on a specific layer.

A network device (e.g., a base station) and/or a WTRU may adapt the signaling mechanism and/or format between them to enable dynamically configurable hierarchical modulation. For example, the network device and the WTRU may utilize one or more control messages transmitted between the network device and the WTRU to ensure that mixed bit-streams modulated using hierarchical modulation techniques may be properly demodulated. In an example, the network device may designate a MCS field (e.g., an existing MCS field or an additional MCS field) in a DCI message to a layer-modulated bit-stream such that there may be multiple (e.g., two) MCS fields in the DCI message that respectively correspond to high priority and low priority bit streams. The network may transmit such a DCI message on an L1 control channel such as the PDCCH, for example.

The DCI message described above may include one or more of the following fields. The DCI message may include a carrier indicator (e.g., a field with 0 or 3 bits). The DCI message may include a resource allocation header (e.g., a one-bit field). The DCI message may include a resource block assignment field that may include a variable number of bits. For example, the resource block assignment field for resource allocation type 0 may include $\lceil N_{RB}^{DL}/P \rceil$ bits. The resource block assignment field for resource allocation type 1 may include a $[\log_2(P)]$-bit header. The header may indicate a selected resource block subset. The resource block assignment field for resource allocation type 1 may include one bit to indicate a shift of a resource allocation span. The resource block assignment field for resource allocation type 1 may include ($\lceil N_{RB}^{DL}/P \rceil - [\log_2(P)] - 1$) bits that provide the resource allocation. The value of P in the foregoing formula may depend on the number of DL resource blocks.

The DCI message may include a TPC command associated with PUCCH (e.g., a 2-bit field). The DCI message may include a downlink assignment index (e.g., a zero, two or four-bit field). The DCI message may include a HARQ process number. The HARQ process number may have a 3-bit value (e.g., when there is a FDD primary cell), a 4-bit value (e.g., when there is a TDD primary cell), and/or the like. The DCI message may include a transport block to codeword swap flag (e.g., a 1-bit field). The DCI message may include precoding information, which may occupy 3 or 6 bits, for example.

For some transport blocks (e.g., those associated with hierarchical modulation layer 1 and/or spatial stream 1), the DCI message may include a MCS field (e.g., a 5-bit field), an indicator for new data (e.g., 1-bit field), and/or a redundancy version indicator (e.g., a 2-bit field). For some transport blocks (e.g., those associated with hierarchical modulation layer 1 and/or spatial stream 2), the DCI message may include a MCS field (e.g., a 5-bit field), an indicator for new data (e.g., a 1-bit field), and/or a redundancy version indicator (e.g., a 2-bit field). For some transport blocks (e.g., those associated with hierarchical modulation layer 2 and/or spatial stream 1), the DCI message may include a MCS field (e.g., a 5-bit field), an indicator for new data (e.g., a 1-bit field), and a redundancy version indicator (e.g., a 2-bit field). For some transport block (e.g., those associated with hierarchical modulation layer 2 and/or spatial stream 2), the DCI message may include a MCS field (e.g., a 5-bit field), an indicator for new data (e.g., a 1-bit field), and a redundancy version indicator (e.g., a 2-bit field).

Figure 9:
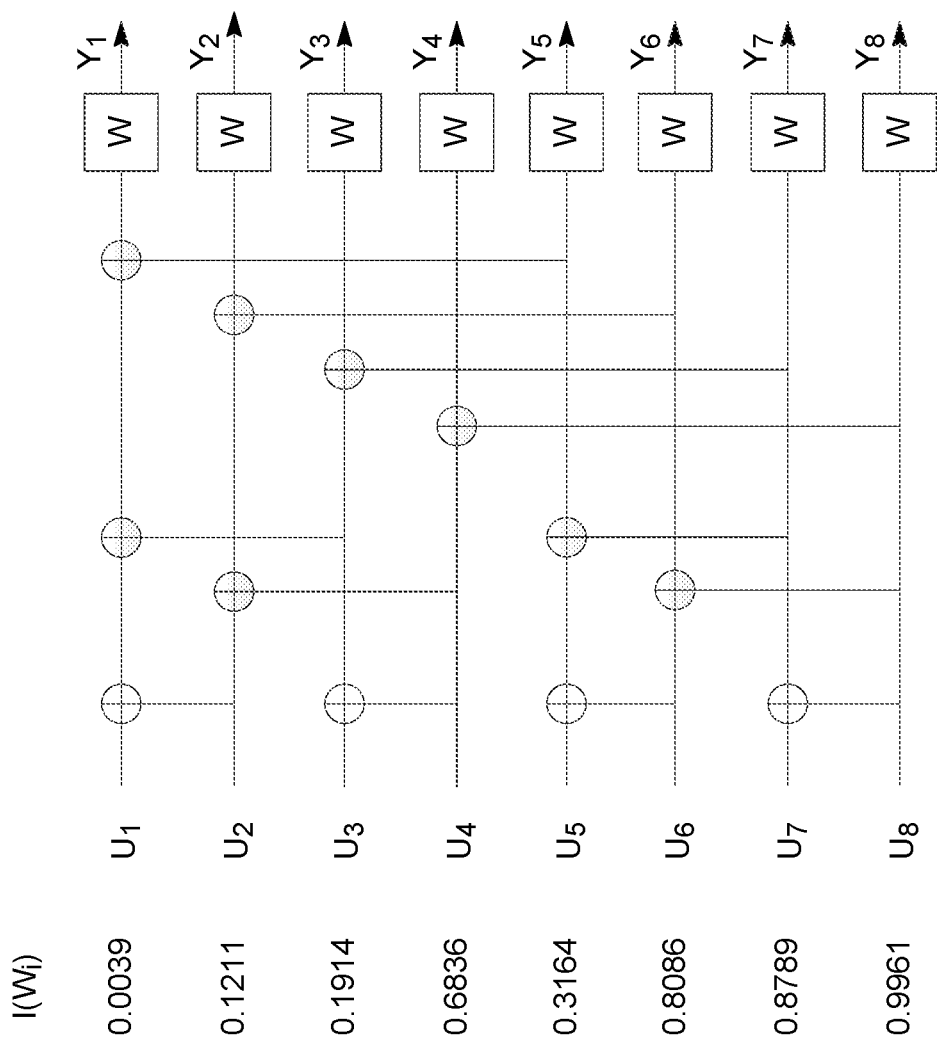
FIG. 9 shows an example of providing mixed services using polar coding.

A communication system as described herein may be configured to provide mixed services (e.g., mixed URLLC and eMBB services) using various coding techniques including, for example, polar coding techniques. FIG. 9 shows an example polar coding structure for providing mixed services. Using the example structure, a communication device (e.g., a network device or a WTRU) may decompose a single lossy channel into parallel correlated channels. One or more (e.g., each) of the parallel correlated channels may be associated with respective different levels of signal reliability relative to one or more other channels. The levels of signal reliability may be indicated by the mutual information, $I(W_1)$, associated with each channel.

In the example shown in FIG. 9, signal reliability relationships between different channels may be governed by Eq. 13:

$$I(W_8) > I(W_7) > I(W_6) > I(W_4) > I(W_5) > I(W_3) > I(W_2) > I(W_1) \qquad \text{Eq. 13}$$

Denoting a binary erasure channel as a BEC, the capacity of BEC(½) may be approximately ½, which may be achieved by applying a rate ½ polar code. In that scenario, channels $W_8$, $W_7$, $W_6$, $W_4$ may be considered robust channels. In the example shown in FIG. 9, the capacities of channel $W_8$ and $W_4$ may be 0.9961 and 0.6836, respectively. As such, channel $W_8$ may be more reliable than channel $W_4$.

In certain polar coding structures (e.g., such as that shown in FIG. 9), a coding rate may be set by selecting a fixed number of channels, e.g., k channels, among N available bit channels associated with a polar encoder, and freezing the inputs to the remaining bit channels (e.g., the remaining (N−k) bit channels). In that scenario, the coding rate may be represented by R=k/N, where N' may be the number of coded bits after puncturing. The coding rate may be varied, for example by varying the value(s) of k and/or N'. In some cases (e.g., when the code word length approaches infinity), the capacity of an unfrozen bit channel may approach 1. In some cases, the respective capacities of k bit channels may be different, and may provide k different levels of message quality.

Data services of various priority levels and protection requirements may be mixed, for example, using advanced coding techniques. For example, URLLC and eMBB data may be mixed to provide one or more protection levels to each service. Different services on backhaul and fronthaul links may also be mixed in which case a wireless link may be used to transport high throughput, low latency data together with lower throughput and higher latency data.

Additional service tiers, which may be associated with respective protection levels, may be implemented to support data services that have different reliability and/or latency configurations. For example, the service tiers may support more than two reliability and/or latency configurations. Data streams may arrive at a communication device and be placed into priority tiers. A CRC may be computed for one or more of the priority tiers (e.g., for each priority tier). Bits from the priority tiers may be distributed to various bit channels, for example to support multiple degrees of protection (e.g., at a code block (CB) level). The distribution may be performed via a mapping operation, for example.

In some examples, there may be k priority tiers corresponding to k polar coding bit channels. As such, a tier may be allocated to each polar coding bit channel. In some examples, there may be fewer than k priority tiers, and a tier may be allocated to multiple bit channels. Priority tiers may be arranged in code blocks according to a bit channel mapping function configured to map data to bit channels. High priority data may be mapped to high quality bit channels, for example to enhance the reliability of vital data. Bit channels that utilizes polar codes may be ranked from high to low. For example, the first K best bit channels may be assigned to URLLC data while the second best J bit channels may be assigned to eMBB data. Remaining bit channels, if any, may be left unused. Assignment of bit channels to a data stream may be conducted based on data demands (e.g., to reflect data demands). The assignment may be communicated (e.g., relayed) to a receiver, for example, through control signaling. In some examples (e.g., when there is a reduced URLLC demand or no URLLC demand), higher quality bit channels may be assigned to eMBB data, for example to increase peak throughput for eMBB data and reduce latency.

A communication device (e.g., a base station or a WTRU) may utilize pre-defined bit mapping rules, semi-static configuration, or dynamic signaling to facilitate bit mapping in mixed services. For example, a gNB may indicate to a WTRU the presence of URLLC data in a TTI, e.g., via L1/L2 control signaling or via RRC signaling. Alternatively or additionally, the communication device may be configured to provide the mixed services based on pre-defined multiplexing rules.

The bit mapping function described herein may be capable of accomplishing more than distributing the bit channels. As an example, bit mapping may provide a priority tier with a specific level of protection, e.g., by mixing high quality bits with lower quality bits for the tier as opposed to giving all high quality bit channels to one tier and low quality bit channels to another tier. Through bit mapping, different services may be interleaved across bit channels in a uniform, partially uniform, or partially localized manner. Bit channels may be grouped and assigned for different services.

Figure 10:
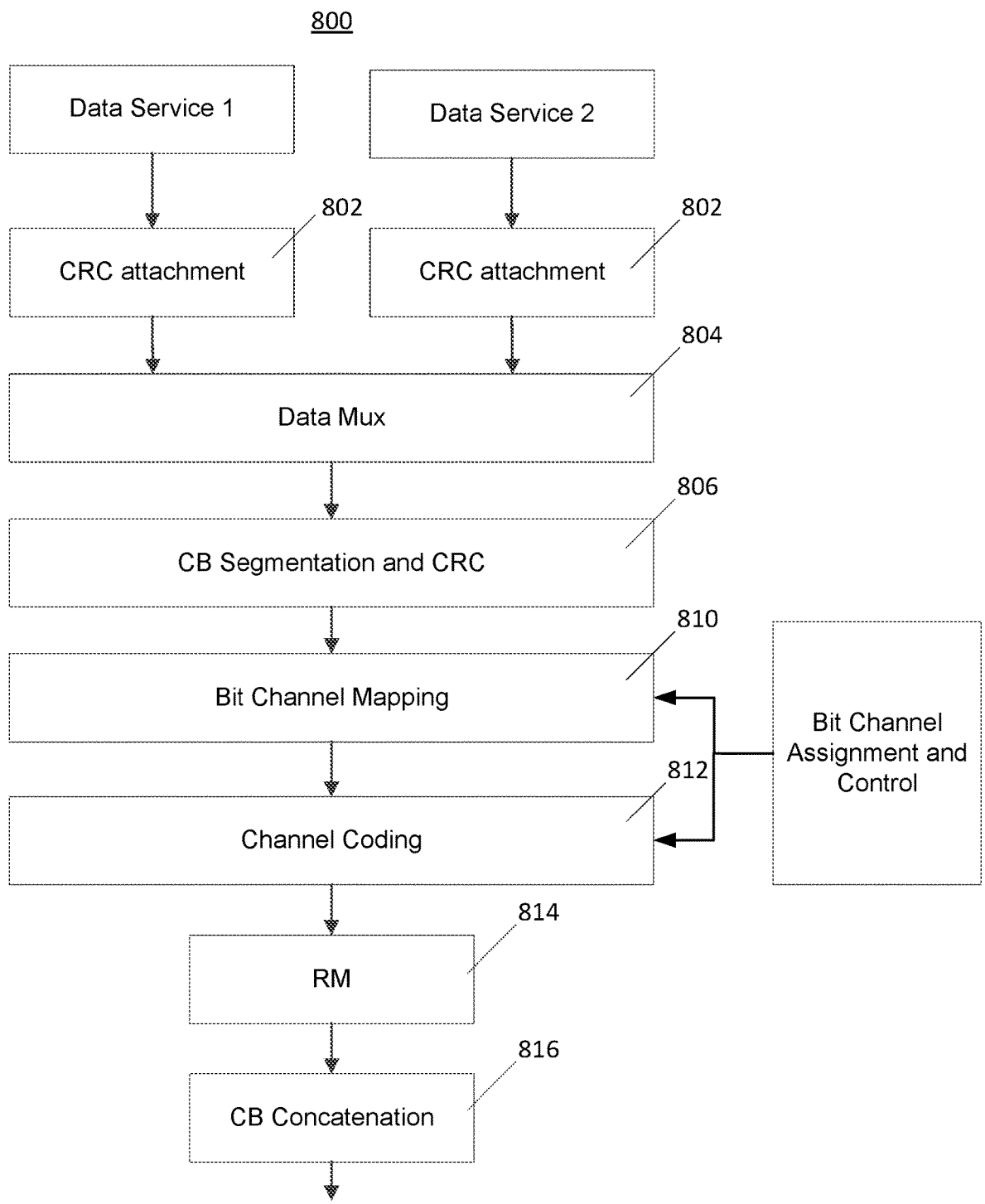
FIG. 10 shows an example flow diagram for a mixed service transmission.

FIG. 10 shows an example flow diagram 800 for a mixed service transmission (e.g., mixed URLLC and eMBB services). As shown, a communication device (e.g., a base station or a WTRU) may perform one or more of the following to during the transmission. The communication device may be configured to provide data service 1 and data service 2. At 802, the communication device may attach CRCs (e.g., unique CRCs) to the respective data streams. At 804, the communication device may multiplex data (e.g., URLLC and eMBB data) associated with the respective data services. At 806, the communication device may segment code blocks and attached a CRC to each segmented code block. At 810, the communication device may perform a bit mapping operation as described herein. At 812, the communication device may perform channel coding using a polar code. The operation at either or both of 810 and 812 may be carried out using bit channel assignment and/or bit channel control information. The communication device may apply rate matching (RM) at 814 and concatenate all or a subset of the code blocks at 816.

The communication device may receive data streams via one or more logical channels (e.g., from separate logical channels). The communication device may multiplex all or a subset of the data streams, for example, before code block segmentation. The communication device may utilize a coding scheme that allows k priority tiers. The communication device may allocate k or fewer data streams to each priority tier.

Figure 11:
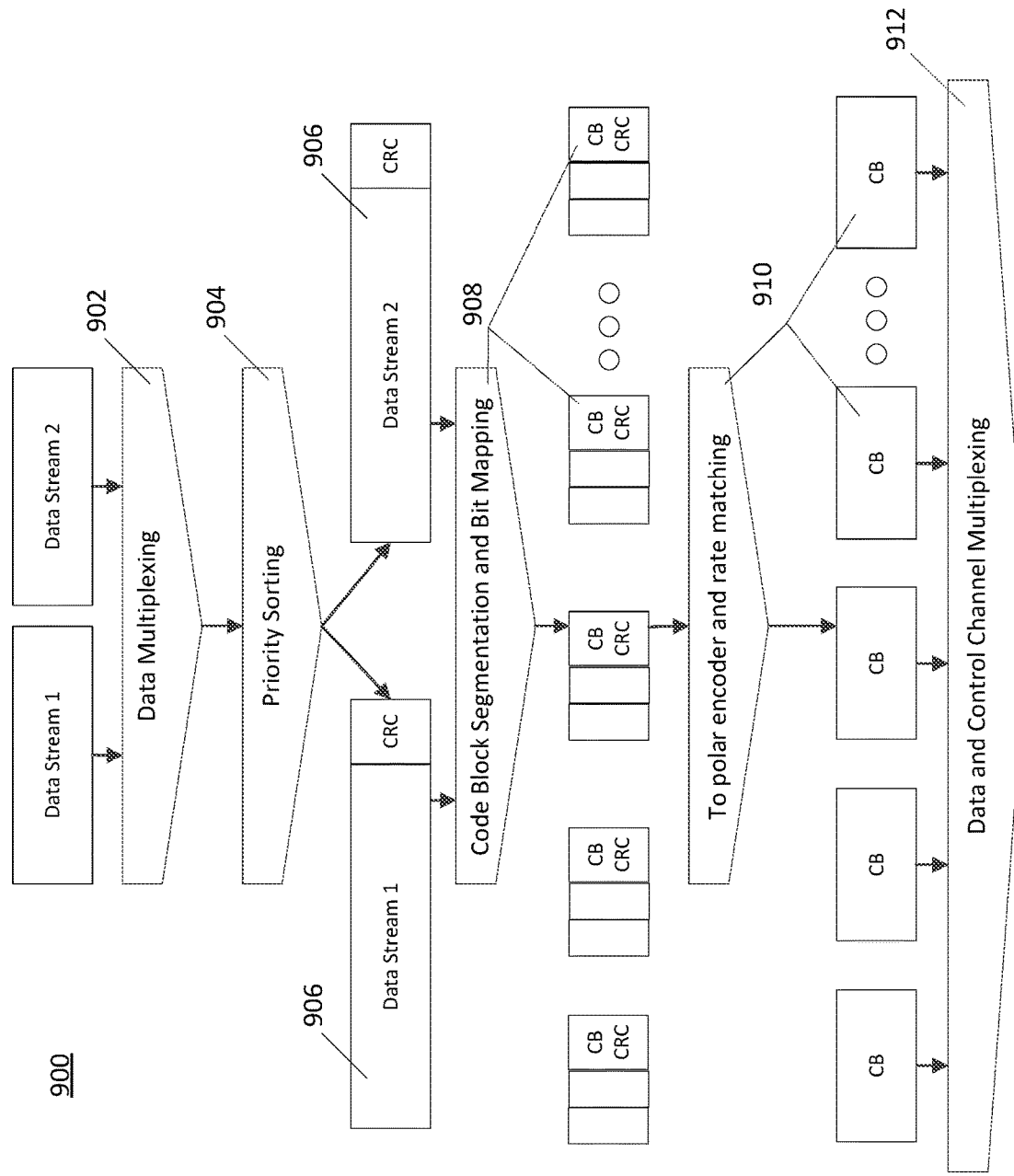
FIG. 11 shows an example flow diagram for using polar coding to process data in a mixed service environment.

FIG. 11 shows an example flow diagram 900 for using polar coding to process data in a mixed service environment. As shown, the communication device may be configured to provide various data services (e.g., mixed URLLC and eMBB services). The data services (e.g., data stream 1 and data stream 2) may be associated with respective layers at a communication device (e.g., a base station or a WTRU). Data stream 1 may include a transport block for URLLC data (e.g., with URLLC priority), and data stream 2 may include a transport block for eMBB data (e.g., with eMBB priority). The transport blocks may be independent of each other. At 902, the communication device may multiplex the data streams together. At 904, the communication device may sort the data in the data streams into multiple priority tiers. At 906, the communication device may attach CRCs (e.g., unique CRCs) to the respective data streams. The CRCs may assist with subsequent recovery of the transport blocks, for example.

At 908, the communication device may perform code block segmentation and/or bit mapping as described herein. The communication device may further apply channel coding (e.g., via a polar encoder) and/or rate matching on segmented code blocks at 910. The communication device may determine which of data stream 1 or data stream 2 has been configured for high reliability transmission. For example, the communication device may determine that data stream 1 has been configured for high reliability transmission, and may consequently provide more robust error protection for that data stream. The communication device may map, e.g., via the bit mapping operation at 908, the data in data stream 1 to one or more high priority bit channels of a code block, while reserving the remaining bit channels for data stream 2. If a c-bit CRC is incorporated into the code block, the communication device may allocate k–c bit channels to data stream 1 or data stream 2, where k may represent the number of priority tiers with which the communication device is configured. The communication device may arrange the ratio (e.g., proportion) of bit channels to data streams based on network dynamics (e.g., network conditions). At 912, the communication device may interleave (e.g., multiplex) the polar-coded blocks with control information, and may concatenate the polar-coded blocks for modulation and/or transmission.

Figure 12:
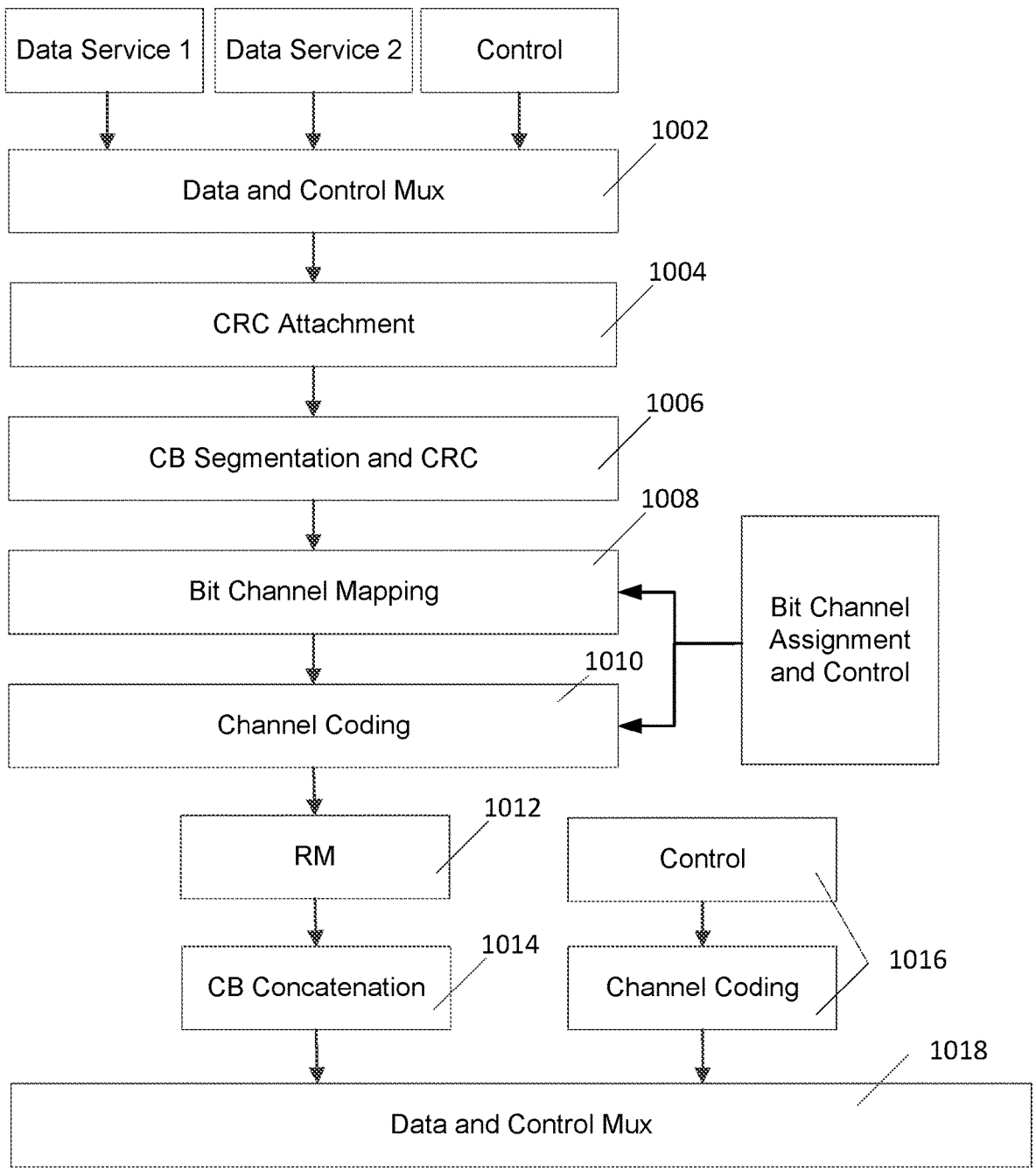
FIG. 12 shows an example flow diagram for processing data and control information in a mixed service environment.

The communication device may be configured to mix higher layer and/or lower layer control information with data associated with mixed services. FIG. 12 shows an example flow diagram 1000 for processing data and control information in a mixed service environment (e.g., mixed URLLC and eMBB services). As shown, the communication device may be configured to provide data service 1 and data service 2. At 1002, the communication device may multiplex data and control information associated with the mixed services (e.g., data service 1 and data service 2). At 1004, the communication device may attach a CRC to multiplexed data and control. The communication device may also switch the operations at 1002 and 1004. For instance, the communication device may attach respective CRCs to the data and control information that are associated with the mixed services at 1002 and perform the multiplexing at 1004. At 1006, the communication device may segment one or more code blocks (CBs) and may attach CRCs to the segmented CBs. The communication device may further perform a bit channel mapping operation at 1008 and may code the channels using a polar code at 1010. At either or both of 1008 and 1010, the communication device may utilize bit channel assignment and/or bit channel control information to assist with the channel mapping and/or channel coding operation. At 1012, the communication device may apply rate matching (RM) to the coding blocks and may further concatenate the coding blocks at 1014. The communication device may additionally code control information at 1016, and concatenate (e.g., multiplex) the data and control information at 1018.

In some examples, delay sensitive control information may be available when a code block is generated. Such delay sensitive control information may be coded with priority-tiered messages, e.g., in parallel with priority tiered messages. The control information and the priority-tiered messages may be interleaved, e.g., post coding. Control messages (e.g., from layer 1 and/or 2) and high level control information such as handover commands or RRM signaling may be multiplexed with data and may be prioritized over the data. Using such techniques, a communication device (e.g., a base station or a WTRU) may reduce redundant transmission of information. The communication device may be configured to assign higher priority to one or more data fields of a control message than other data fields. The communication device may distribute control messages over multiple priority tiers. The communication device may allocate (e.g., via a bit channel mapper) bit channels in a way to maintain priority levels between the various control and data messages.

Figure 13:
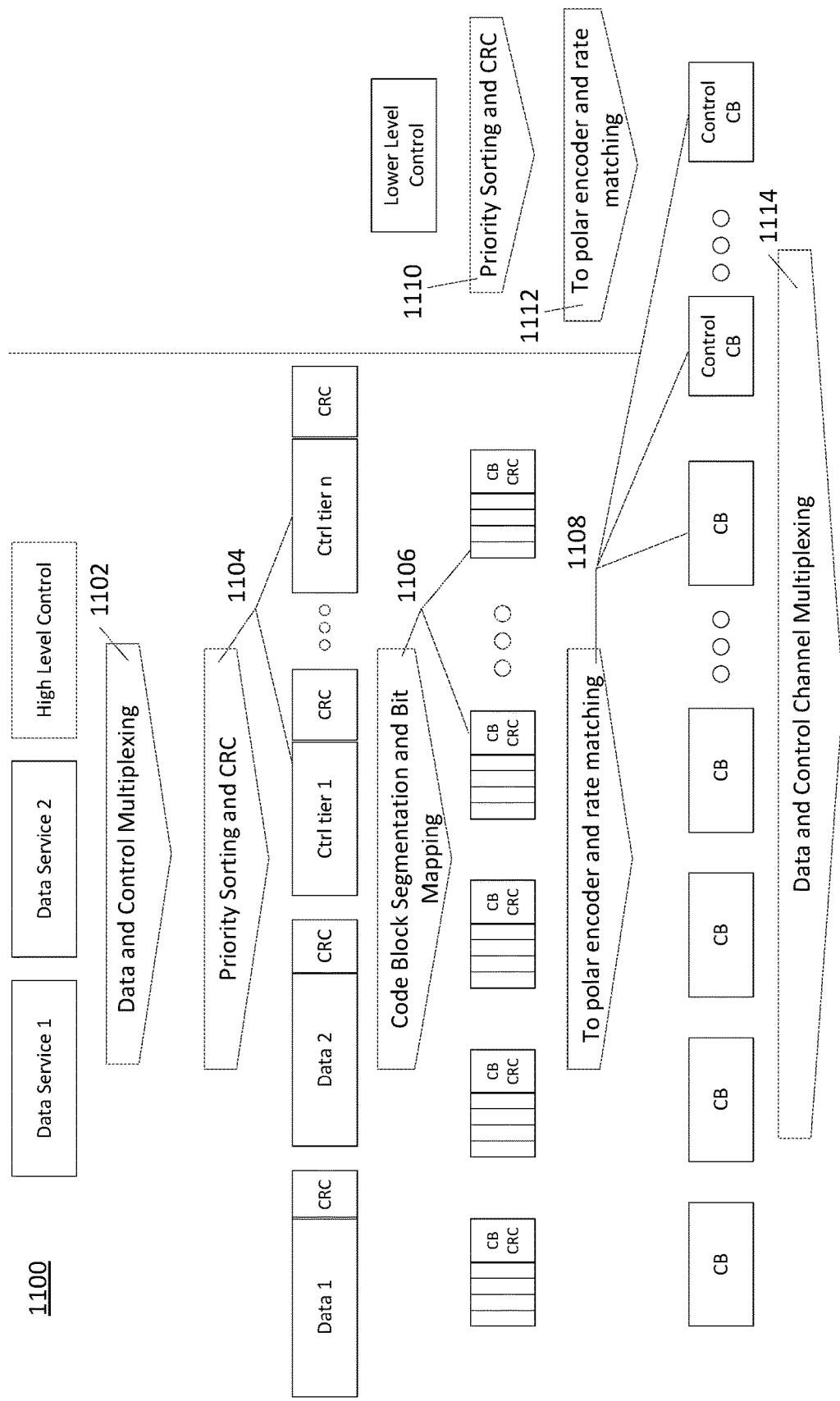
FIG. 13 shows an example flow diagram for using polar codes to prioritize mixed service data that may be multiplexed with control information.

FIG. 13 shows an example flow diagram 1100 for using polar codes to prioritize mixed service data (e.g., mixed URLLC and eMBB data) that may be multiplexed with control information. A communication device (e.g., a base station or a WTRU) may be configured to mix (e.g., multiplex) multiple data services (e.g., data service 1 and data service 2) with high level and/or low level control information. The data and/or control information may be sorted into multiple priority tiers.

To illustrate, at 1102, the communication device may multiplex high level control information with data service 1 and/or data service 2. At 1104, the communication device may sort (e.g., split into multiple tiers) the data and/or control information into multiple tiers. The sorting may be conducted, for example based on the priority of the control signal and/or the precision of control signal measurements. For example, the most significant bits of a measurement may be protected more than the least significant bits of the measurement. The communication device may also attach CRCs (e.g., unique CRCs) to the respective tiers. The tiers may be mapped to code block bits, e.g., according to the protection level associated with each coding bit and/or the priority assigned to each tier. At 1106, the communication device may segment one or more code blocks (CBs) and may attach CRCs to the CBs. The communication device may also perform bit mapping at 1106 as described herein. At 1108, the communication device may perform channel coding (e.g., via a polar encoder) and/or rate matching on the concerned data and the high level control information.

The communication device may encode low level control information separately. A same or similar procedure as described above may be applied to processing the low level control information. For example, at 1110, the communication device may sort (e.g., split) the low level control information into multiple tiers based on the priority of the control signal and/or the precision of control signal measurements. At 1112, the communication device may perform channel coding (e.g., via a polar encoder) and/or rate matching. At 1114, the communication device may multiplex code blocks associated with the low level control information with the concerned data and/or the high level control information. Results of the multiplexing may be modulated and/or transmitted.

Processes and instrumentalities described herein may apply in any combination and may apply to other wireless technologies and/or services. Although features and elements are described herein in particular combinations and/or orders, each feature and element may be used alone or in any combination or in any order with and without other features and elements. Although examples provided herein may pertain to New Radio (NR) or 5G-specific protocols, the scope of the disclosure is not limited to the provided examples or referenced communication technologies. The disclosure herein may be applicable to a wider variety of examples and implementations, including other wireless systems.

A WTRU may refer to an identity of the physical device, or to the user's identity such as subscription related identities, e.g., MSISDN, SIP URI, etc. A WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), comprising:
a processor configured to:
receiving, from a wireless network, a resource allocation associated with transmitting a first bit-stream configured with a first priority;
determine that a second bit-stream is to be transmitted to the wireless network, the second bit-stream being configured with a second priority that is higher than the first priority; and
transmit the first bit-stream and the second bit-stream using at least a subset of the resource allocation in accordance with a measurement of the wireless network, wherein:
when the measurement indicates that the wireless network is in a first condition, the first bit-stream and the second bit-stream are transmitted using multiple hierarchical modulation layers, the first bit-stream being mapped to an enhancement layer and the second bit-stream being mapped to a base layer; and when the measurement indicates that the wireless network is in a second condition, the first bit-stream and the second bit-stream are transmitted using a single modulation layer.

2. The WTRU of claim 1, wherein the first condition indicates that a channel quality indication (CQI) value associated with the wireless network is above a threshold, and wherein the second condition indicates that the CQI value is below the threshold.

3. The WTRU of claim 1, wherein the processor is further configured to receive downlink control information from the wireless network indicating a first modulation to be used for the enhancement layer and a second modulation to be used for the base layer.

4. The WTRU of claim 1, wherein the processor is further configured to determine whether to transmit the first and second bit-streams using the single modulation layer or the multiple hierarchical modulation layers on a per-subframe or per-slot basis.

5. The WTRU of claim 1, wherein the processor is further configured to determine whether to transmit the first and second bit-streams using the single modulation layer or the multiple modulation layers in each TTI, each slot, or each OFDM symbol.

6. The WTRU of claim 1, wherein the processor is further configured to determine whether to transmit the first and second bit-streams using the single modulation layer or the multiple hierarchical modulation layers every M OFDM symbols, M having a preconfigured value.

7. The WTRU of claim 1, wherein, when the first bit-stream and the second bit-stream are transmitted using the single modulation layer, the second bit-stream is punctured into the first bit-stream.

8. The WTRU of claim 1, wherein, when the first bit-stream and the second bit-stream are transmitted using the single modulation layer, the first bit-stream is multiplexed with the second bit-stream using a rate-matching technique.

9. A wireless transmit/receive unit (WTRU), comprising:
a processor configured to:
receive, from a wireless network, downlink control information (DCI), wherein the DCI indicates that the WTRU will receive a transmission, whether the transmission will utilize a single modulation layer or multiple modulation layers, and one or more modulation and coding schemes associated with the transmission;
receive, from the wireless network, the transmission that utilizes the single modulation layer or the multiple modulation layers, wherein, on a condition that the transmission utilizes the multiple modulation layers, the transmission comprises a first bit-stream modulated using a first MCS at a first hierarchical layer and a second bit-stream modulated using a second MCS at a second hierarchical layer, the first bit-stream being associated with a first priority and the second bit-stream being associated with a second priority, the second priority being higher than the first priority; and
demodulate transmission based on the DCI.

10. The WTRU of claim 9, wherein the DCI further comprises redundancy information associated with the first bit-stream and the second bit-stream.

11. A base station configured to transmit a first bit-stream and a second bit-stream over a wireless network, the base station comprising:
a processor configured to:
determine that the first bit-stream has a first priority and the second bit-stream has a second priority, the second priority being higher than the first priority;
determine, based on a condition of the wireless network, whether to transmit the first bit-stream and the second bit-stream together using a single modulation layer or multiple hierarchal modulation layers that comprise a base layer and an enhancement layer;
based on a determination that the condition of the wireless network has a first characteristic, transmit the first and second bit-streams together to a wireless transmit/receive unit (WTRU) via the single modulation layer; and
based on a determination that the condition of the wireless network has a second characteristic, transmit the first and second bit-streams to the WTRU together via the multiple hierarchal modulation layers, wherein the first bit-stream is modulated at the enhancement layer and the second bit-stream is modulated at the base layer.

12. The base station of claim 11, wherein the condition of the wireless network is determined based on a measurement report provided by the WTRU.

13. The base station of claim 12, wherein the processor is further configured to indicate to the WTRU that a first modulation and coding scheme (MCS) is used for the first bit-stream and a second MCS is used for the second bit-stream.

14. The base station of claim 13, wherein the indication regarding the first and second MCSs is included in downlink control information.

15. The base station of claim 11, wherein the determining of whether to transmit the first bit-stream and the second bit-stream using the single modulation layer or the multiple hierarchal modulation layers is performed on a per-subframe or per-slot basis.

16. The base station of claim 11, wherein the determining of whether to transmit the first bit-stream and the second bit-stream using the single modulation layer or the multiple hierarchal modulation layers is performed per TTI, per slot, or per OFDM symbol.

17. The base station of claim 11, wherein the determining of whether to transmit the first bit-stream and the second bit-stream using the single modulation layer or the multiple hierarchal modulation layers is performed every M OFDM symbols, M having a preconfigured value.

* * * * *